(12) United States Patent
Sen et al.

(10) Patent No.: US 12,477,354 B2
(45) Date of Patent: Nov. 18, 2025

(54) ESTIMATING AND COMPENSATING ANTENNA ARRAY MISALIGNMENT

(71) Applicant: QUALCOMM Incorporated, San Diego, CA (US)

(72) Inventors: Pinar Sen, San Diego, CA (US); Seyong Park, San Diego, CA (US); Abdelrahman Mohamed Ahmed Mohamed Ibrahim, San Diego, CA (US); Renqiu Wang, San Diego, CA (US); Muhammad Sayed Khairy Abdelghaffar, San Jose, CA (US); Yu Zhang, San Diego, CA (US); Krishna Kiran Mukkavilli, San Diego, CA (US); Tingfang Ji, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 17/663,656

(22) Filed: May 16, 2022

(65) Prior Publication Data

US 2023/0370860 A1 Nov. 16, 2023

(51) Int. Cl.
*H04W 16/28* (2009.01)
*H04B 7/06* (2006.01)

(52) U.S. Cl.
CPC .......... *H04W 16/28* (2013.01); *H04B 7/0617* (2013.01); *H04B 7/0695* (2013.01)

(58) Field of Classification Search
CPC ...... H01Q 1/246; H01Q 3/267; H01Q 3/2605; H01Q 25/00; H04W 56/0035; H04B 7/0617; H04B 7/0417; H04L 25/0224
See application file for complete search history.

(56) References Cited

U.S. PATENT DOCUMENTS

| | | | | |
|---|---|---|---|---|
| 4,129,872 A | * | 12/1978 | Toman | H01Q 25/00 343/768 |
| 6,208,294 B1 | * | 3/2001 | Kobayakawa | H01Q 3/2605 342/368 |
| 9,585,044 B2 | * | 2/2017 | Park | H04B 7/0626 |
| 2002/0071406 A1 | * | 6/2002 | Bursztejn | H04B 7/06 370/241 |
| 2004/0253987 A1 | * | 12/2004 | Lee | G01S 3/74 455/562.1 |

(Continued)

*Primary Examiner* — Yee F Lam
(74) *Attorney, Agent, or Firm* — QUALCOMM IP DEPT.; James Hunt Yancey, Jr.

(57) ABSTRACT

Certain aspects relate to techniques for estimating and compensating for antenna array rotation of a wireless node. For example, the antenna array of the wireless node may rotate about one or more of an x-axis, a y-axis, and a z-axis, which may misalign the antenna array relative to another antenna array of another wireless node, causing degradation of communications between the two nodes. In some examples, the wireless node may obtain, from a first antenna array of the other wireless node via a second antenna array of the first wireless node, a first pilot signal and a second pilot signal via a first beam. In some examples, the first wireless node may perform a first alignment compensation based on a phase difference between the first pilot signal and the second pilot signal.

30 Claims, 14 Drawing Sheets

(56) References Cited

U.S. PATENT DOCUMENTS

| | | | |
|---|---|---|---|
| 2006/0058022 A1* | 3/2006 | Webster | H04B 17/21 455/67.11 |
| 2013/0257655 A1* | 10/2013 | Hu | H04B 7/0686 342/373 |
| 2018/0167903 A1* | 6/2018 | Fan | H04L 25/0224 |
| 2019/0149251 A1* | 5/2019 | Zenkyu | H01Q 15/0013 375/262 |
| 2019/0173652 A1* | 6/2019 | Fehrenbach | H04L 5/0073 |
| 2019/0267709 A1* | 8/2019 | Mow | H01Q 21/24 |
| 2019/0349048 A1* | 11/2019 | Huang | H04B 7/0613 |
| 2022/0279535 A1* | 9/2022 | Tsui | H04L 25/0222 |
| 2023/0232405 A1* | 7/2023 | Huang | H04L 5/0094 370/329 |
| 2023/0284177 A1* | 9/2023 | Zhou | H04W 64/003 455/456.1 |

* cited by examiner

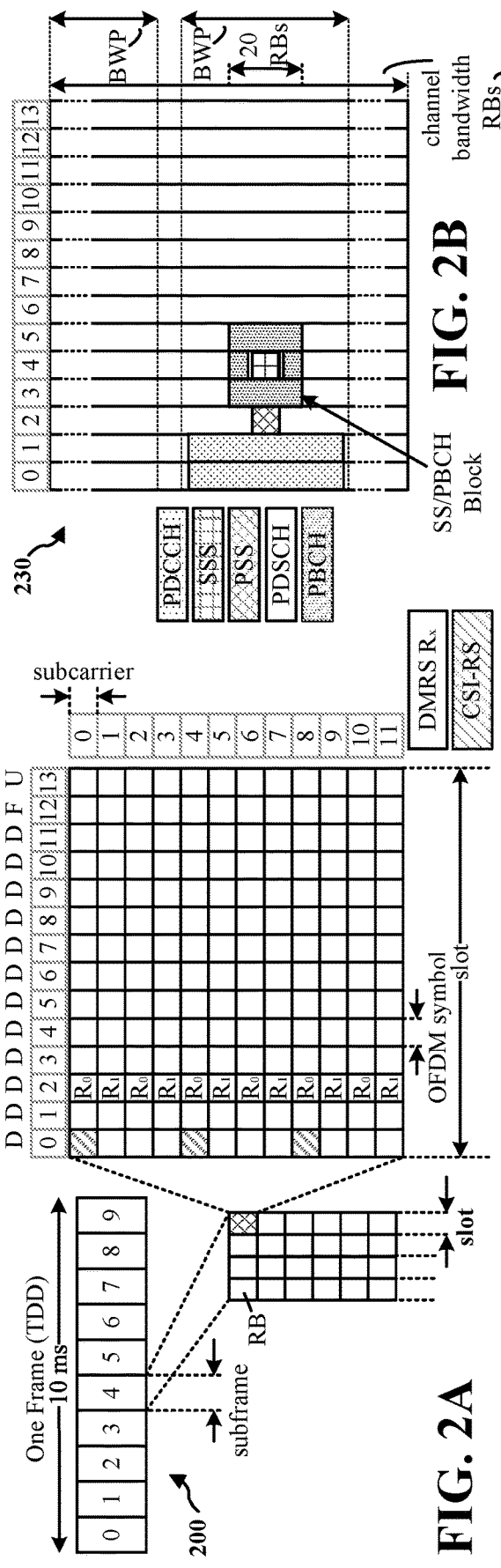
FIG. 2A
FIG. 2B
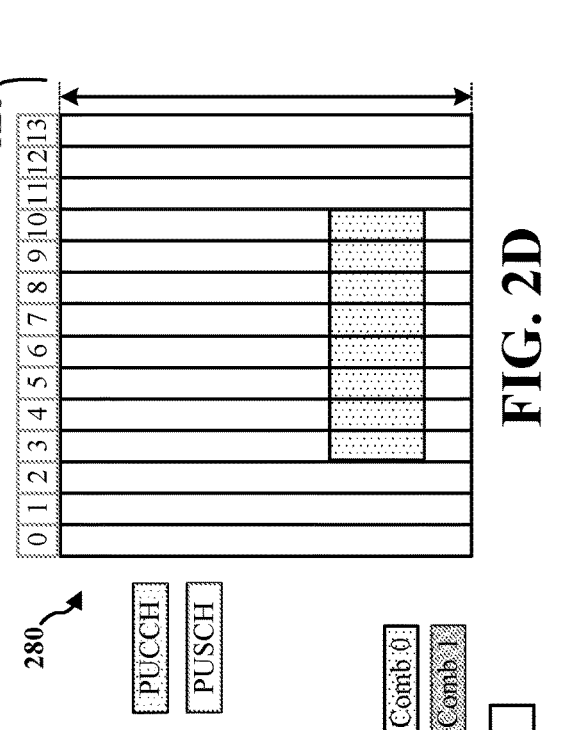
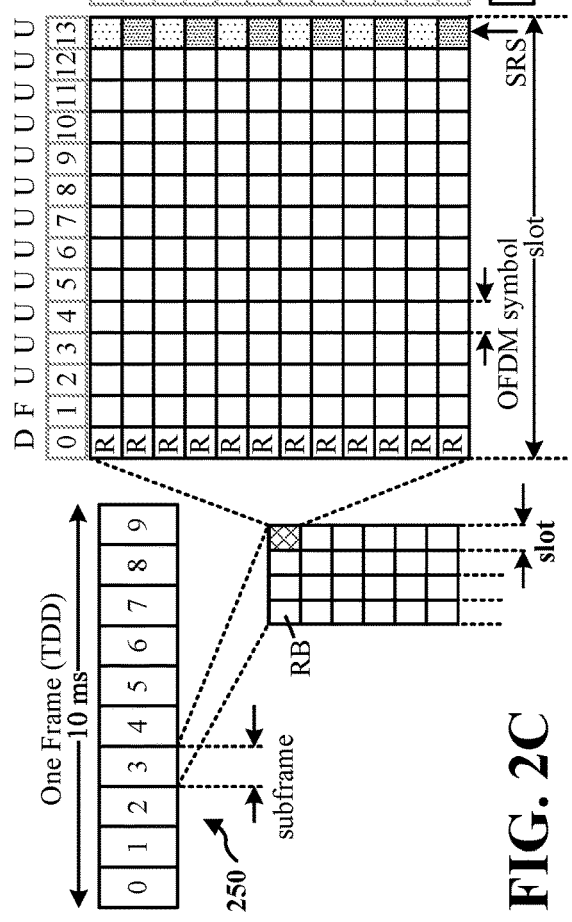
FIG. 2C
FIG. 2D

ESTIMATING AND COMPENSATING ANTENNA ARRAY MISALIGNMENT

BACKGROUND

Technical Field

The present disclosure generally relates to communication systems, and more particularly, to techniques for estimating and compensating antenna array misalignment.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communications at a first wireless node. In some examples, the method includes obtaining, from a first antenna array of a second wireless node via a second antenna array of the first wireless node, a first pilot signal and a second pilot signal via a first beam. In some examples, the method includes performing a first alignment compensation of at least one of the first beam or the second antenna array based on a first rotation of the second antenna array relative to the first antenna array, said first rotation being based on a phase difference between the first pilot signal and the second pilot signal.

Certain aspects are directed to a method for wireless communications at a first wireless node. In some examples, the method includes outputting, for transmission to a second wireless node, a first pilot signal via a first beam from a first antenna array. In some examples, the method includes obtaining, from the second wireless node, a parallel shift based on the first pilot signal, wherein the parallel shift is indicative of a parallel shift of the first antenna array relative to a second antenna array of the second wireless node. In some examples, the method includes performing a first alignment compensation of at least one of the first beam or the first antenna array based on the parallel shift.

Certain aspects are directed to an apparatus configured for wireless communication. The apparatus may include a memory comprising instructions, and one or more processors configured to execute the instructions. In some examples, the one or more processors are configured to obtain, from a first antenna array of a wireless node via a second antenna array of the apparatus, a first pilot signal and a second pilot signal via a first beam. In some examples, the one or more processors are configured to perform a first alignment compensation of at least one of the first beam or the second antenna array based on a first rotation of the second antenna array relative to the first antenna array, said first rotation being based on a phase difference between the first pilot signal and the second pilot signal.

Certain aspects are directed to an apparatus configured for wireless communication. In some examples, the apparatus includes a memory comprising instructions, and one or more processors configured to execute the instructions. In some examples, the one or more processors are configured to output, for transmission to a wireless node, a first pilot signal via a first beam from a first antenna array. In some examples, the one or more processors are configured to obtain, from the wireless node, a parallel shift based on the first pilot signal, wherein the parallel shift is indicative of a parallel shift of the first antenna array relative to a second antenna array of the wireless node. In some examples, the one or more processors are configured to perform a first alignment compensation of at least one of the first beam or the first antenna array based on the parallel shift.

Certain aspects are directed to first wireless node for wireless communications. In some examples, the first wireless node includes means for obtaining, from a first antenna array of a second wireless node via a second antenna array of the first wireless node, a first pilot signal and a second pilot signal via a first beam. In some examples, the first wireless node includes means for performing a first alignment compensation of at least one of the first beam or the second antenna array based on a first rotation of the second antenna array relative to the first antenna array, said first rotation being based on a phase difference between the first pilot signal and the second pilot signal.

Certain aspects are directed to a first wireless node for wireless communications. In some examples, the first wireless node includes means for outputting, for transmission to a second wireless node, a first pilot signal via a first beam from a first antenna array. In some examples, the first wireless node includes means for obtaining, from the second wireless node, a parallel shift based on the first pilot signal, wherein the parallel shift is indicative of a parallel shift of the first antenna array relative to a second antenna array of the second wireless node. In some examples, the first wireless node includes means for performing a first alignment compensation of at least one of the first beam or the first antenna array based on the parallel shift.

Certain aspects are directed to a non-transitory computer-readable medium having instructions stored thereon that, when executed by a first wireless node, cause the first wireless node to perform operations comprising obtaining, from a first antenna array of a second wireless node via a second antenna array of the first wireless node, a first pilot signal and a second pilot signal via a first beam. In some examples, the operations include performing a first alignment compensation of at least one of the first beam or the second antenna array based on a first rotation of the second antenna array relative to the first antenna array, said first rotation being based on a phase difference between the first pilot signal and the second pilot signal.

Certain aspects are directed to a non-transitory computer-readable medium having instructions stored thereon that, when executed by a first wireless node, cause the first wireless node to perform operations comprising outputting, for transmission to a second wireless node, a first pilot signal via a first beam from a first antenna array. In some examples, the operations include obtaining, from the second wireless node, a parallel shift based on the first pilot signal, wherein the parallel shift is indicative of a parallel shift of the first antenna array relative to a second antenna array of the second wireless node. In some examples, the operations include performing a first alignment compensation of at least one of the first beam or the first antenna array based on the parallel shift.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
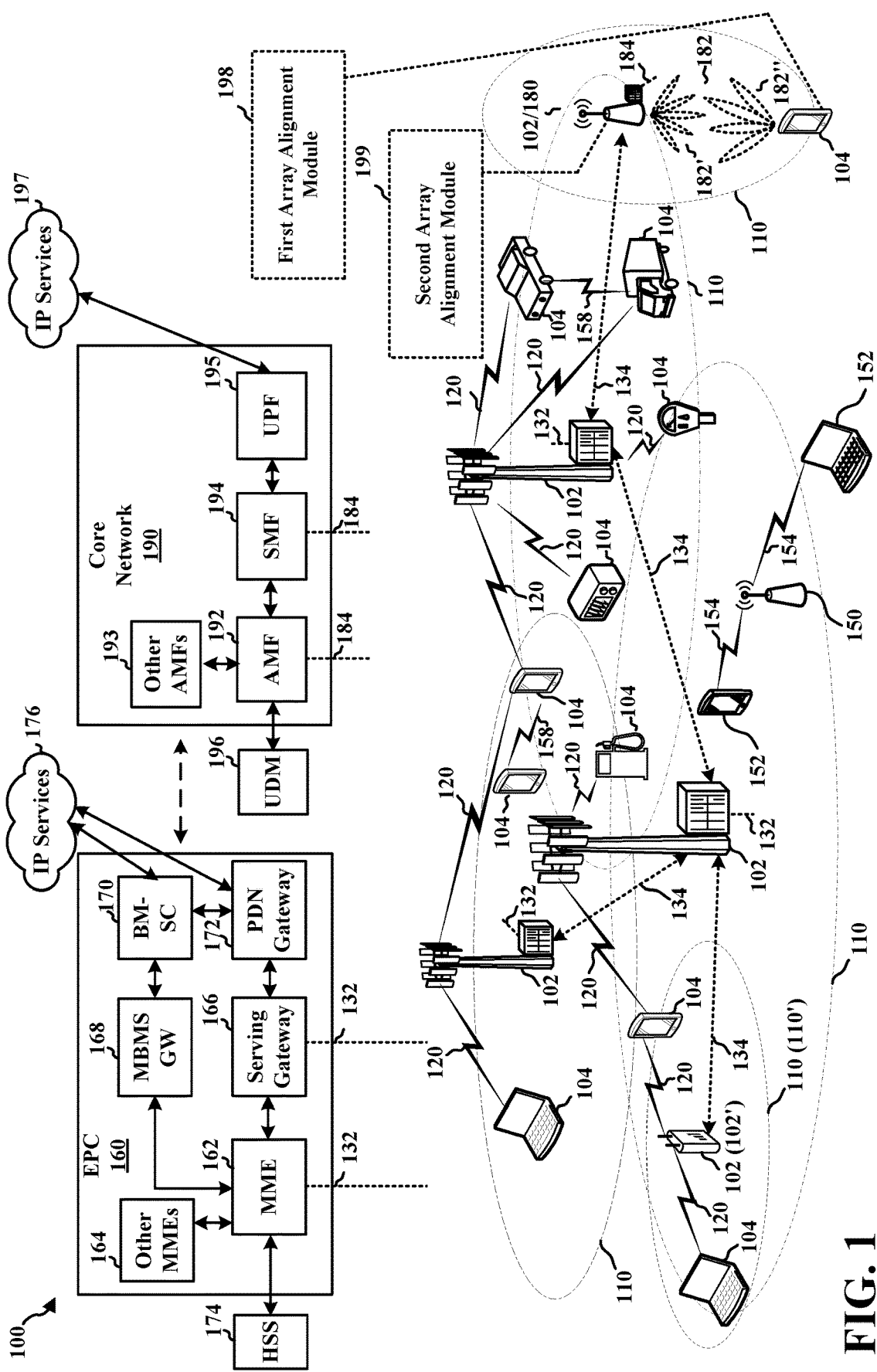
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In certain scenarios, wireless communications (e.g., line-of-sight (LOS) communications) between two or more devices may be defined by a high multiplexing gain relative to other communications (e.g., beyond LOS (BLOS) or massive multiple-input multiple output (MIMO)). High multiplexing gain may generally result in an accurate precoder and channel knowledge at the transmitter. In some examples, a distance between a transmitting antenna array and a receiving antenna array may be a factor in determining a multiplexing gain between the two devices. For example, at shorter distances, one may expect a relatively higher multiplexing gain for wireless communications than at longer distances. However, rotation of one or more of the antenna arrays may result in a performance loss, even at shorter distances.

Accordingly, certain aspects of the disclosure are directed to techniques for estimating misalignment of a first antenna array with a second antenna array (e.g., a user equipment (UE) antenna array with a base station antenna array). Misalignment of antenna arrays may cause deleterious effects to a communication link between two nodes that employ the antenna arrays.

In a first scenario (e.g., illustrated in FIG. 8), a misalignment process may be performed by one or both of the wireless nodes communicating with each other. Both of the wireless nodes may have one or more of a mechanical compensation capability or a digital compensation capability. Such compensation capabilities may be used by the nodes to correct or compensate for axial rotation of an antenna array of one or both nodes.

In this scenario, one or both of the wireless nodes may perform an x-axis/y-axis rotation estimation to determine whether their respective antenna arrays are misaligned due to a rotation of the array about an x- or y-axis. In some examples, one or both of the nodes may transmit a rotation pilot signal to the other node. The other node may receive the pilot signal and estimate the rotation based on the received pilot signal. If a rotation causing misalignment between the two nodes is detected, then one or both of the nodes may perform a mechanical and/or digital compensation to correct or compensate for the misalignment. The compensation may improve the communication quality between the two wireless nodes.

However, in certain aspects, the communication quality between the two nodes may be affected by a parallel shift of one or more of the two nodes. That is, a node may have moved along an x-axis or y-axis, thereby reducing the quality of the communications. In some examples, one or both of the nodes may determine a distance between the two nodes in order to determine whether the distance is a small distance or a large distance. If the distance is large, then the nodes may refrain from performing a parallel shift estimation and compensation. Conversely, if the distance is small, then one or both of the nodes may transmit parallel shift pilot signals to the other node. One or both of the nodes receiving the parallel shift pilot signals may estimate a parallel shift between their respective antenna arrays relative to the other node's antenna array based on the received signals. One or both of the nodes may then perform one or more of a mechanical and/or digital compensation to correct or compensate for the misalignment to improve the communication quality between the two nodes.

In certain aspects, a wireless node may transmit a z-rotation pilot signal to the other wireless node. The other wireless node may receive the pilot signal and estimate a z-rotation based on the received signal. The receiving node may then perform one or more of a mechanical and/or digital compensation at its own antenna array to correct or compensate for the misalignment to improve the communication quality between the two nodes.

In a second scenario (e.g., illustrated in FIG. 9), a misalignment process may be performed by one or both of the wireless nodes communicating with each other. One of the wireless nodes may have one or more of a mechanical compensation capability or a digital compensation capability, whereas the other node may not have the capability or may not be able to use the capability.

In some examples, the misalignment process may begin with a parallel shift estimation. If a parallel shift is detected, then the wireless node with the compensation capability may perform the mechanical or digital compensation. That is, one or both of the nodes may estimate whether there is a parallel shift relative to the other node. The node that cannot perform compensation may transmit an indication of the estimated parallel shift to the other node, so that the other node can perform the mechanical and/or digital compensation. If the node that can perform compensation performs the estimation, it may also perform compensation based on the estimation without transmitting the estimation to the other node.

In certain aspects, one or both nodes may also perform x-axis and y-axis rotation estimation to determine if there has been a rotation of a node's antenna array relative to the other node's array. Here, one or both of the nodes may transmit a x/y rotation pilot signal to the other node. Similar to the parallel shift estimation, a node that cannot perform compensation may transmit an indication of an estimated x-axis and y-axis rotation to the node that can perform the compensation. The node that can perform the compensation may perform the compensation based on its own x-axis and y-axis rotation estimation and/or the received x-axis and y-axis rotation estimation received from the other node. The two nodes may perform multiple iterations x-axis and y-axis rotation estimation to compensate or correct any misalignment caused by x-axis and y-axis rotation.

In certain aspects, a wireless node may transmit a z-rotation pilot signal to the other wireless node. The other wireless node may receive the pilot signal and estimate a z-rotation based on the received signal. The receiving node may then perform one or more of a mechanical and/or digital compensation at its own antenna array to correct or compensate for the misalignment to improve the communication quality between the two nodes.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Throughout the disclosure, a "network node" may be used to refer to a base station or a component of the base station. A base station can be implemented as an aggregated base station (e.g., FIG. 4), as a disaggregated base station (e.g., FIG. 5), an integrated access and backhaul (IAB) node, a relay node, etc. Accordingly, a network node may refer to one or more of a central unit (CU), a distributed unit (DU), a radio unit (RU), a near-real time (near-RT) radio access network (RAN) intelligent controller (RIC), or a non-real time (non-RT) RIC.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Further, although the present disclosure may focus on vehicle-to-everything (V2X), the concepts and various aspects described herein may be applicable to other similar areas, such as D2D communication, IoT communication, Industrial IoT (IIoT) communication, and/or other standards/protocols for communication in wireless/access networks. Additionally or alternatively, the concepts and various aspects described herein may be of particular applicability to one or more specific areas, such as vehicle-to-pedestrian (V2P) communication, pedestrian-to-vehicle (P2V) communication, vehicle-to-infrastructure (V2I) communication, and/or other frameworks/models for communication in wireless/access networks.

Referring again to FIG. 1, in certain aspects, the UE 104 and/or base station 102/180 may be configured with a first array alignment module 198. The first array alignment module 198 may be configured to obtain, from a first antenna array of a wireless node, a first pilot signal and a second pilot signal via a first beam; and perform a first alignment compensation of at least one of the first beam or the second antenna array based on a first rotation of a second antenna array relative to the first antenna array, said first rotation being based on a phase difference between the first pilot signal and the second pilot signal.

Referring again to FIG. 1, in certain aspects, the UE 104 and/or base station 102/180 may be configured with a second array alignment module 199. In some examples, the second array alignment module 199 may be configured to output, for transmission to a base station, a first pilot signal via a first beam from a first antenna array; obtain, from the base station, a parallel shift estimation based on the first pilot signal, wherein the parallel shift estimation is indicative of a parallel shift of the first antenna array relative to a second antenna array of the base station; and perform a first alignment compensation of at least one of the first beam or the first antenna array based on the parallel shift estimation.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
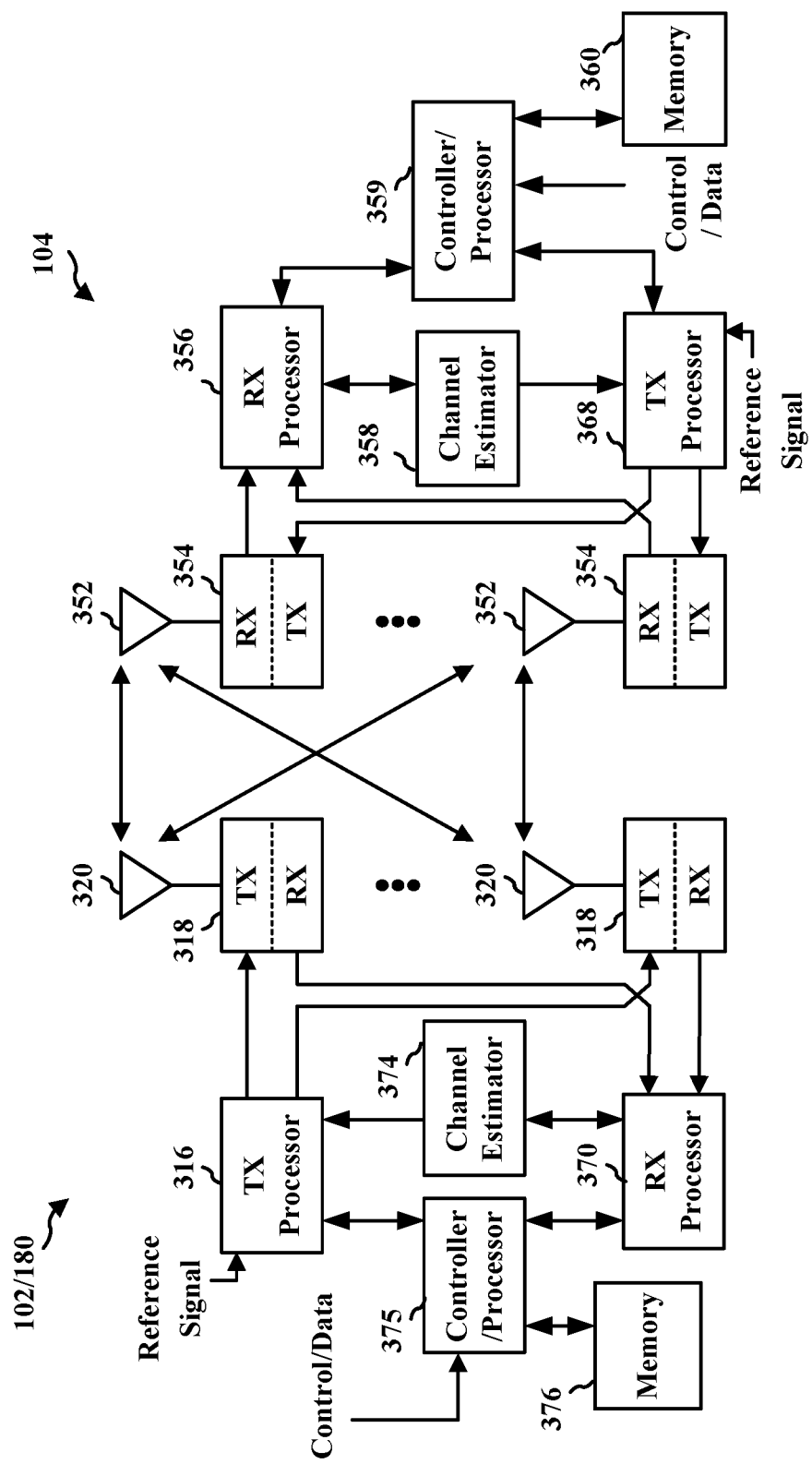
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320.

Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 199 of FIG. 1.

Figure 4:
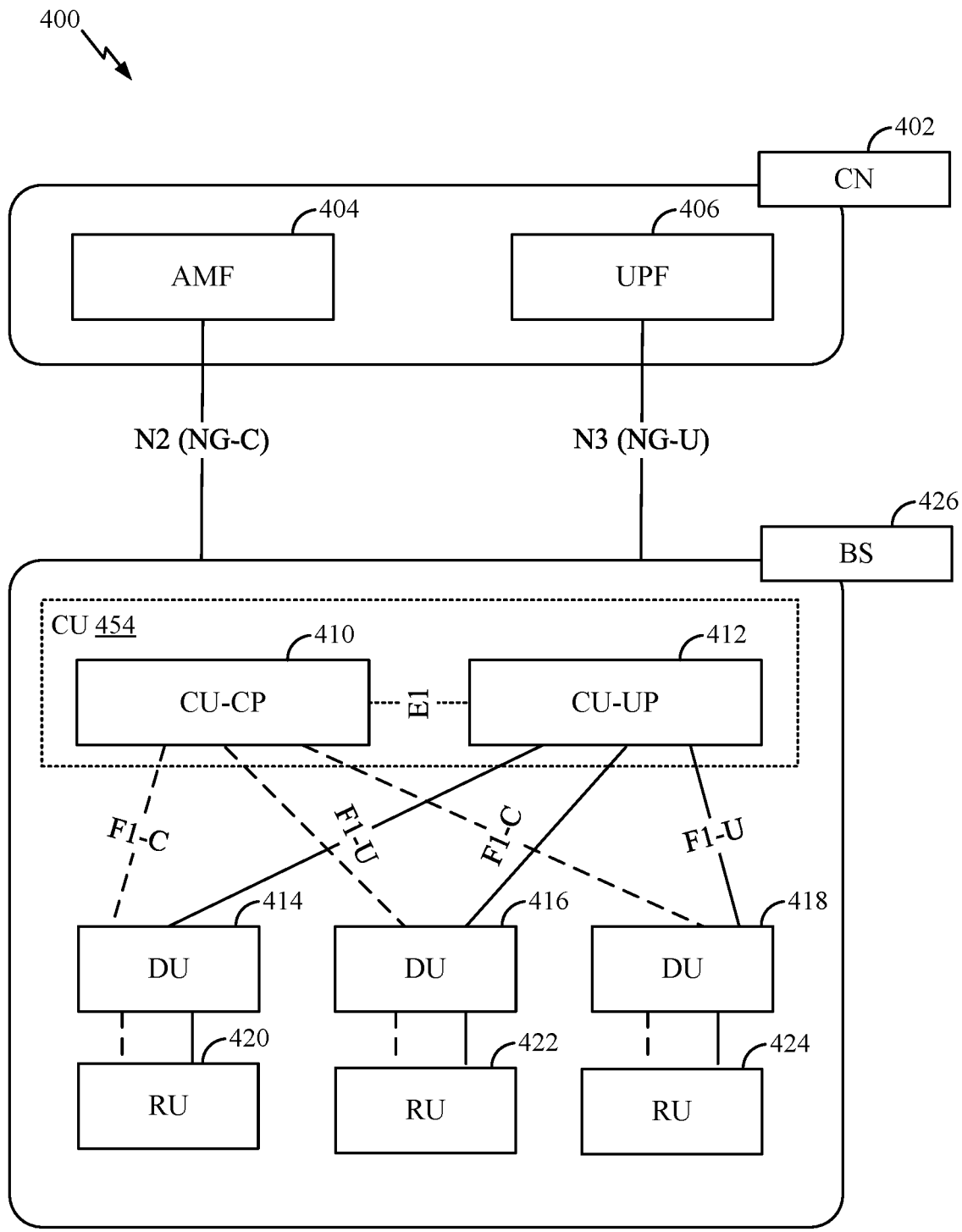
FIG. 4 is a block diagram illustrating an example monolithic (e.g., aggregated) base station and architecture of a distributed radio access network (RAN).

FIG. 4 illustrates an example monolithic (e.g., disaggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
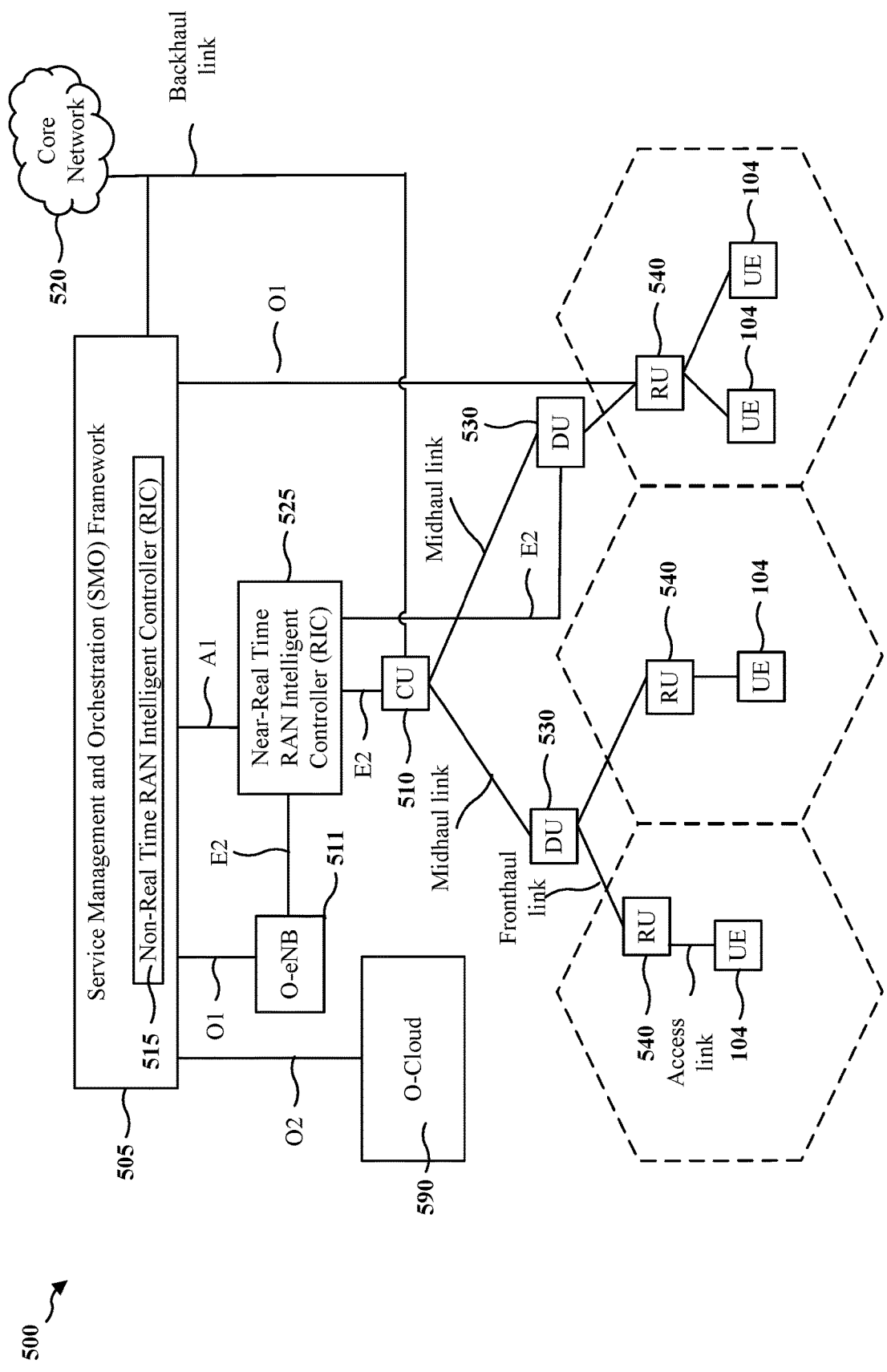
FIG. 5 is a block diagram illustrating an example disaggregated base station architecture.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit-user plane (CU-UP)), control plane functionality (i.e., central unit-control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Figure 6:
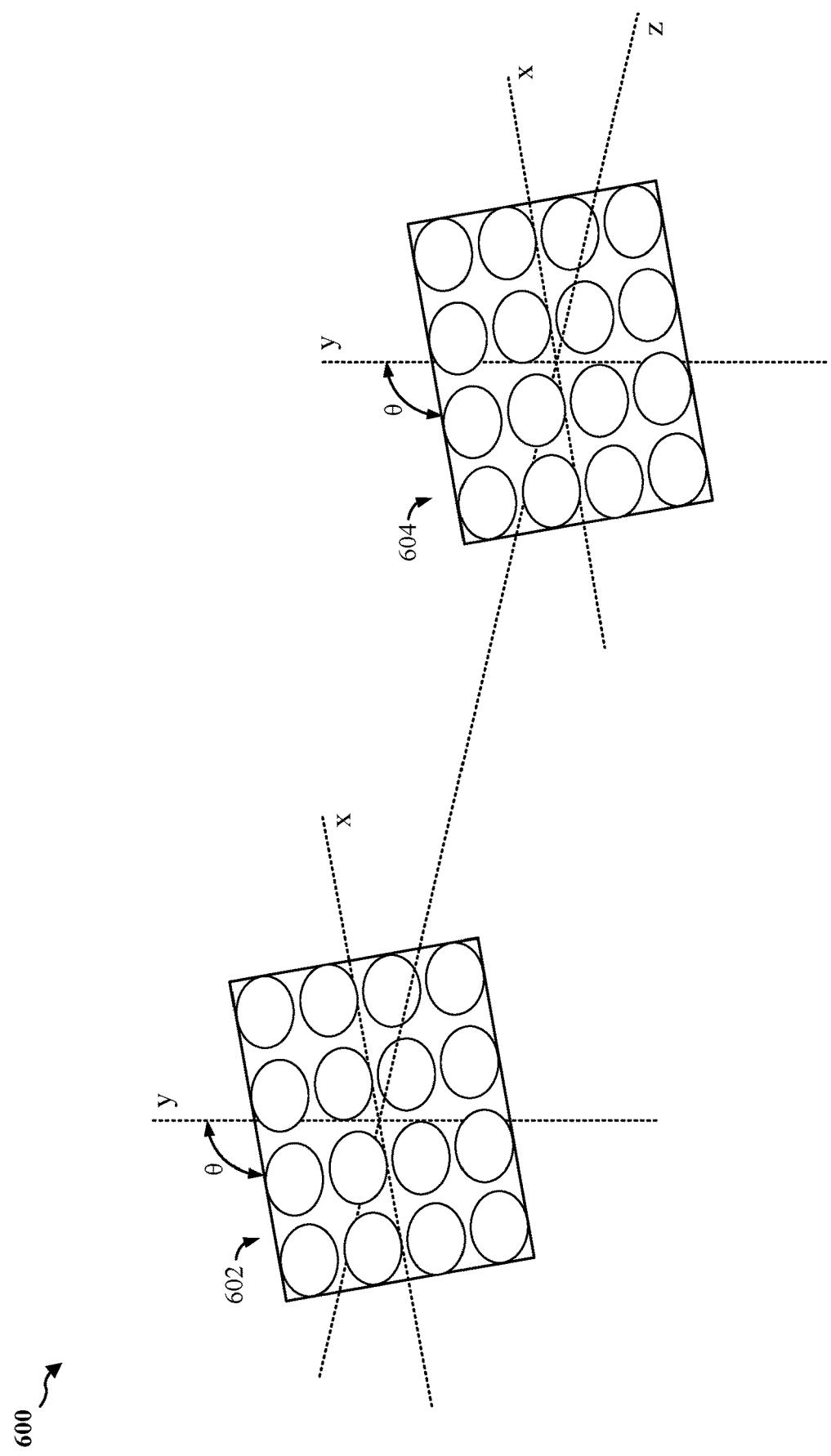
FIG. 6 is a block diagram illustrating an arrangement of example antenna arrays, including a first antenna array and a second antenna array.

FIG. 6 is a block diagram illustrating a perspective view of an arrangement of example antenna arrays 600, including a first antenna array 602 and a second antenna array 604. For the purposes of providing a simplified explanation, each antenna array includes 16 antenna elements. It is appreciated, however, that the number of antenna elements illustrated and recited throughout the disclosure are examples, and antenna arrays with any suitable number of antenna elements, including a different number of elements in one of the antenna arrays relative to the other antenna array, are within the scope of the present disclosure.

The first antenna array 602 may be an antenna array of a first wireless node (e.g., a base station, a base station component, a UE, etc.), and the second antenna array 604 may be an antenna array of a second wireless node. As illustrated, the first antenna array 602 and the second antenna array 604 may be aligned with each other relative to a z-axis (e.g., the z-axis that extends through the center of each of the antenna arrays and is perpendicular to a surface of each of the antenna arrays). Accordingly, the first antenna array 602 and the second antenna array 604 are parallel to each other and share the same angular rotation (e.g., θ) about the common z-axis. As illustrated, the first wireless node and the second wireless node may communicate directly with each other via the first antenna array 602 and the second antenna array 604 using LOS MIMO.

The first antenna array 602 and the second antenna array 604 are also aligned about common x- and y-axes. Here, a planar surface of each antenna array is parallel with both the x-axis and y-axis planes. That is, a planar surface of the first antenna array 602 and a planar surface of the second antenna array 604 are directly facing each other perpendicular to the z-axis. In this example, communication performance is optimal between first wireless node and the second wireless node because the alignment of the respective antenna arrays are aligned on all three axes.

Figure 7:
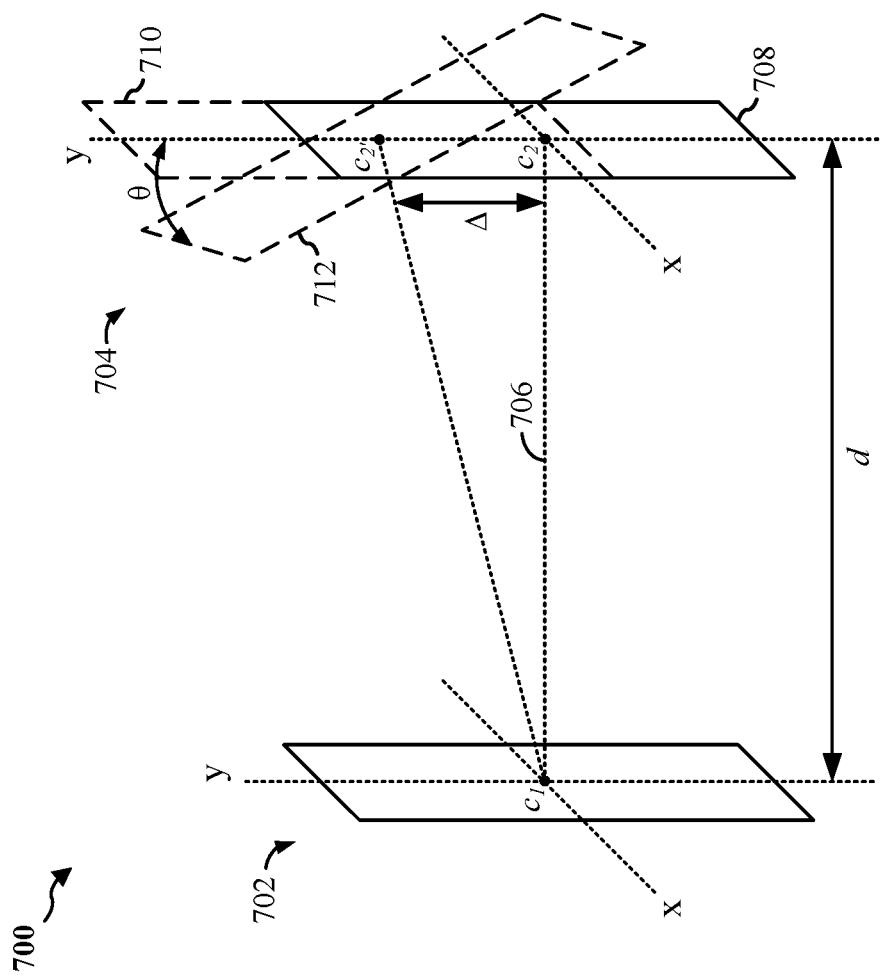
FIG. 7 is a diagram illustrating a side-view of an arrangement of example antenna arrays, including a first antenna array associated with a first wireless node, and a second antenna array associated with a second wireless node.

FIG. 7 is a diagram illustrating a side-view of an arrangement of example antenna arrays 700, including a first antenna array 702 (e.g., associated with a first wireless node)

and a second antenna array 704 (e.g., associated with a second wireless node). An initial position 708 of the second antenna array 704 is shown aligned with the first antenna array 702 along an x-axis, y-axis, and z-axis. Here, the center of the first antenna array 702 is shown as $c_1$ and the center of the initial position 708 of the second antenna array 704 is shown as $c_2$. The distance between $c_1$ and $c_2$ is shown as d. In some examples, the second antenna array 704 may shift vertically (e.g., by a distance of Δ) along an x/y axis to a second position 710 such that it is still parallel to the first antenna array 702. The center of the second antenna array 704 after being parallel shifted is $c_{2'}$. In another example, the second antenna array 704 may rotate (e.g., by θ degrees) about an x/y axis to a third position 712 relative to the first antenna array 702. Although FIG. 7 illustrates the third position 712 of the second antenna array 704 as a rotation about an x-axis having center $c_{2'}$, it should be noted that such a rotation is not dependent on a parallel shift, and thus, may be made about the x- and/or y-axis of the initial center (e.g., $c_2$).

An x/y-axis rotation may be defined as an angle between the second antenna array 704 and a line (e.g., reference line 706) that extends through the centers of the first antenna array 702 and the second antenna array 704. The reference line 706 may be the same as the z-axis illustrated in FIG. 6. For example, prior to the x/y rotation, the angle between the second antenna array 704 and the reference line 706 may be equal to the same angle in relation to the first antenna array 702. In other words, the first antenna array 702 and the second antenna array 704 are aligned prior to any x/y rotation. As discussed in more detail below, one or more of the first wireless node and the second wireless node may estimate the rotation of its own corresponding antenna array relative to the reference line 706. One or more of the first wireless node and the second wireless node may perform beam steering to compensate for the x/y-axis rotation, and/or rotate one or more of the first antenna array 702 and the second antenna array 704 about the x/y-axis to compensate for the x/y-axis rotation.

In certain aspects, θ and a combination of θ and Δ may be estimated by one or more of the first wireless node or the second wireless node based on received pilot signals. For example, the combination of θ and Δ may be estimated base on a virtual rotation θ' (e.g., a rotation resulting from a parallel shift) given by equation 1 below. A wireless node may estimate a total rotation (e.g., both parallel shift and/or x/y-axis rotation). This way, the wireless node is not required to transmit additional pilot signals for parallel shift estimation, because a single set of pilot signals may be used to estimate the total rotation. For example, a phase of each signal received at each antenna of the second antenna array 704 may be used to estimate a rotation of the second antenna array 704.

$$\theta' = \tan^{-1}\left(\frac{\Delta}{d}\right) \quad \text{Equation 1}$$

Using equation 1, a wireless node may determine either θ', Δ, or d, if the other of the two values are known. For example, the wireless node may calculate d using any suitable distance estimation algorithm (e.g., map-based techniques, round-trip time (RTT) measurements, observed time difference of arrival (OTDOA), etc.).

Misalignment of antenna arrays can result in significant degradation of communication performance between wireless nodes, depending on the type of misalignment and the amount of misalignment. For example, communications between the first wireless node and the second wireless node may result from the first antenna array 602 and/or the second antenna array 604 rotating about one or more of the x-axis, the y-axis, or the z-axis, such that the arrays are no longer aligned.

However, as discussed herein, misalignment can be estimated and resolved through compensation mechanisms, such as beam forming or beam steering, and physically adjusting a position of one or more of the antenna arrays. For example, using beam forming or beam steering, a wireless node may adjust a direction of a primary lobe of a beam radiation pattern by switching antenna elements and/or by changing relative phases of the RF signals driving the antenna elements. In some examples, a position of an antenna array may be adjusted via a mechanical means, such as a motor.

Examples of Correcting/Compensating Antenna Array Misalignment

Figure 8:
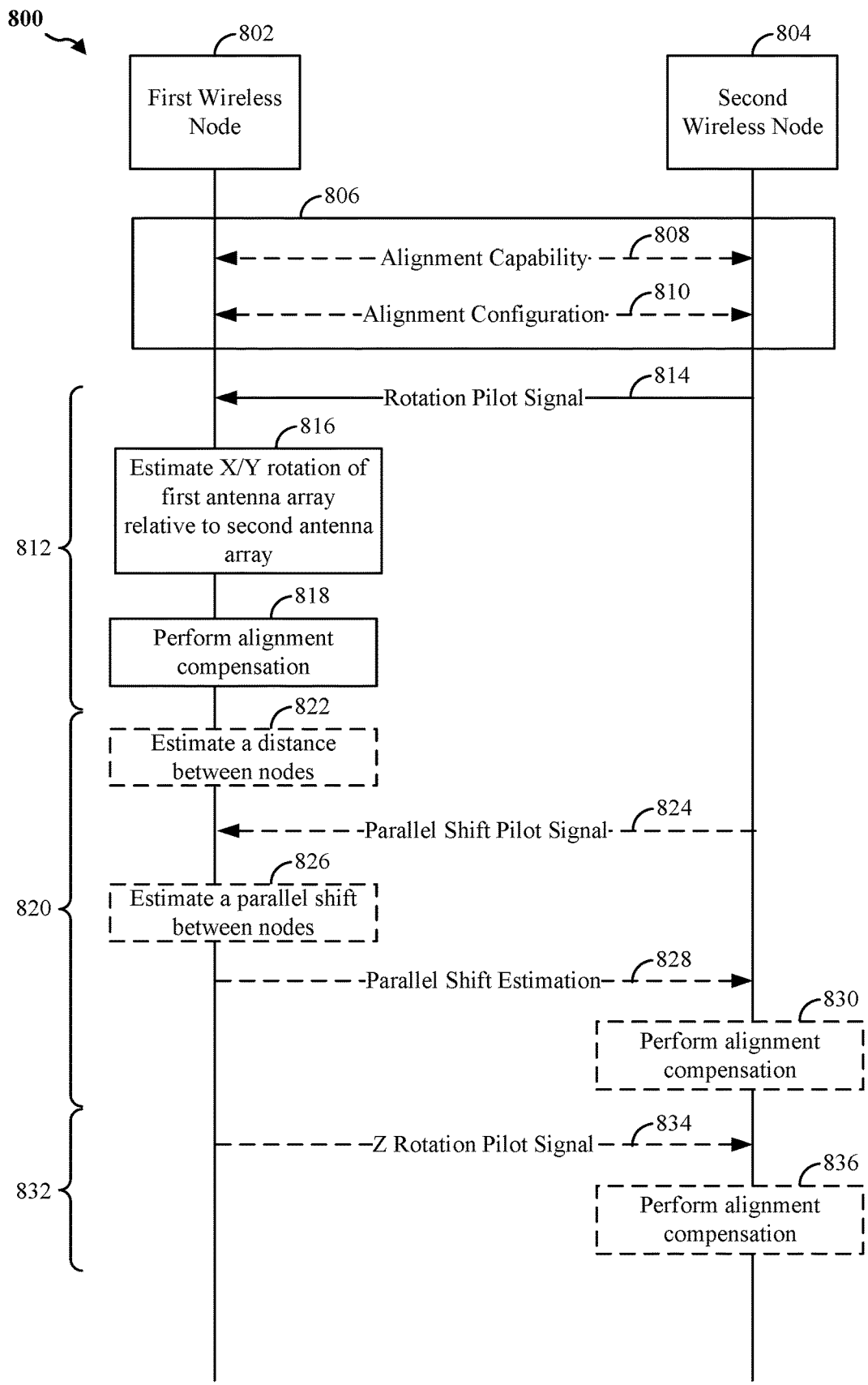
FIG. 8 is a call-flow diagram illustrating example communications between a first wireless node and a second wireless node.

FIG. 8 is a call-flow 800 diagram illustrating example communications between a first wireless node 802 (e.g., UE 104 of FIGS. 1 and 3, base station 102/180 of FIGS. 1 and 3, a relay or repeater node, etc.) and a second wireless node 804 (e.g., UE 104 of FIGS. 1 and 3, base station 102/180 of FIGS. 1 and 3, a relay or repeater node, etc.). In certain aspects, the communications are made via a LOS MIMO wireless link between the first wireless node 802 and the second wireless node 804.

The first wireless node 802 includes a first antenna array, and the second wireless node 804 include a second antenna array. Each of the antenna arrays are coupled to a transceiver and configured to transmit and receive wireless signals. In this example, both of the first wireless node 802 and the second wireless node 804 are configured to rotate their respective antenna arrays via one or more of the z-axis, the x-axis, and the y-axis (e.g., z-axis, x-axis, and y-axis illustrated in FIGS. 6 and 7) by mechanical means such as a motor or other suitable mechanism capable of moving the wireless node or the antenna array.

Initially, the first wireless node 802 and the second wireless node 804 may perform initialization communications 806 to provide each other with an indication of their capabilities and/or to configure each other for correcting/compensating antenna array misalignment. In some examples, the initialization communications 806 may include communication of an alignment capability 808 and/or an alignment configuration 810. The alignment capability 808 and alignment configuration 810 communications may be transmitted and received via radio resource control (RRC) messaging.

Regarding the alignment capability 808, one or more of the first wireless node 802 and the second wireless node 804 may transmit an indication of their respective alignment capabilities to the other wireless node sot that each side is aware of the capabilities of the other wireless node. Alignment capabilities 808 may include an indication that a corresponding wireless node is capable of a particular rotation. For example, an RRC message with the alignment capabilities 808 may include one or more fields, with each field providing an indication of whether the wireless node can perform antenna array rotation in a particular direction. Accordingly, the RRC message may include a field for one or more of x-axis rotation, y-axis rotation, and z-axis rotation. In some examples, the alignment capabilities 808 may be configured to indicate whether the wireless node can perform beam forming and/or beam steering.

For example, the first wireless node 802 may output, for transmission to the second wireless node 804, an alignment capability 808 of the first wireless node 802, wherein the alignment capability 808 indicates one or more axes of rotation that the first wireless node 802 is configured to correct via compensation of at least one of a beam used for communication with the second wireless node 804 (e.g., via beam forming and/or beam steering) or rotation of the first antenna array used by the first wireless node 802 for communication with the second wireless node 804. The first wireless node 802 may also obtain an alignment capability of the second wireless node 804, wherein the alignment capability indicates one or more axes of rotation that the second wireless node 804 is configured to correct via at least one of beam steering or rotation of the second antenna array.

Regarding the alignment configuration 810, one or more of the first wireless node 802 and the second wireless node 804 may transmit information configuring the other wireless node for antenna array misalignment compensation/correction. For example, the alignment configuration 810 may include an indication a type of pilot signal to use for measuring antenna array alignment, of a number of antenna elements that will transmit the pilot signal, a particular phase shift that will be applied to a plurality of pilot signals, etc.

At a first step 812, the first wireless node 802 and the second wireless node 804 may estimate and compensate antenna array misalignment caused by x-axis and/or y-axis rotation (e.g., rotation about an x-axis or y-axis as illustrated in FIGS. 6 and 7) of the first antenna array and/or the second antenna array. Here, the second wireless node 804 may transmit one or more rotation pilot signals 814 to the first wireless node 802. The rotation pilot signals 814 may be a specialized pilot signal configured for estimating antenna panel rotation or may be a general pilot signal. For example, a specialized pilot signal for measuring rotation may include a plurality of pilot signals characterized by a linear phase shift progression. In this example, each subsequent pilot signal may be shifted in phase (e.g., $\pi/2$, $\pi$) relative to a previous pilot signal (e.g., a first pilot signal may be transmitted with a $e^{-j\pi/2}$ phase shift, a second pilot signal may be transmitted with a $e^{-j0}$ phase shift, a third pilot signal may be transmitted with a $e^{j\pi/2}$ phase shift, etc.).

Upon receiving the one or more rotation pilot signals 814, the first wireless node 802 may perform a second step 816 by estimating a first rotation of its own antenna array (e.g., the first antenna array) relative to the second antenna array of the second wireless node 804. The rotation may be estimated based on a phase difference between an expected phase and the phase of a received pilot signal, or based on phase differences between multiple received pilot signals received from the second wireless node 804.

Based on the computed phase difference(s), the first wireless node 802 may perform a third step 818 by performing an alignment compensation of at least one of a beam used by the first wireless node 802 and/or compensation of the first antenna array based on the estimated rotation of the first antenna array relative to the second antenna array. For example, the first wireless node 802 may use beam steering or beam forming to redirect the beam it uses for communication with the second wireless node 804 to compensate for the estimated rotation. Alternatively, or in addition, the first wireless node 802 may physically move the first antenna array to compensate and correct the estimated rotation. Here, the first wireless node 802 may rotate the first antenna array about an axis parallel to a planar surface of the first antenna array (e.g., rotate about an x-axis or y-axis as illustrated in FIGS. 6 and 7).

In some examples, the first wireless node 802 may determine whether to perform the first step 812 again to further refine the position of the first antenna array and/or the direction of the beam. For example, the first wireless node 802 may obtain, from the second wireless node, another pilot signal after the third step 818. The first wireless node 802 may then estimate another rotation of the first antenna array relative to the second antenna array based on another phase difference between the other pilot signal and one or more of the rotation pilot signals 814 received during the first step 812. Based on the estimated rotation, the first wireless node 802 may perform another iteration of the third step 818 to further refine the alignment between the first antenna array and the second antenna array. Determining whether to one or more additional iterations of the first step 812 may be based on additional pilot signals received from the second wireless node 804 after performing the third step 818.

Although FIG. 8 shows only the second wireless node 804 as transmitting the rotation pilot signals 814 and the first wireless node as performing the estimating and alignment compensation, the communications may be mirrored such that both of the wireless nodes transmit rotation pilot signals and perform estimating and alignment compensation. Accordingly, only one wireless node may perform the first step 812, or both may perform the first step 812.

The first wireless node 802 and the second wireless node may optionally perform a fourth step 820 for determining and compensating for parallel shifts in the first antenna array and/or the second antenna array. The fourth step 820 may be performed after the first step 812 in order to correct or compensate residual parallel shift misalignments of the two antenna arrays that remain after compensation of the third step 818.

Initially, the first wireless node 802 may perform a fifth step 822 by estimating a distance between the two nodes to determine whether an estimated distance satisfies a threshold condition. For example, if the estimated difference is greater than a defined value or outside of a range of values, then the first wireless node 802 may refrain from performing the fourth step 820. For example, if the estimated range indicates that the two wireless nodes are too far away from each other, then compensating for a parallel shift may not provide any improvement, or may only provide negligible improvement, to wireless communications between the two nodes. For example, a close distance may be a distance within 10× an antenna aperture product (e.g., aperture of a Tx antenna array multiplied by an aperture of an Rx antenna array). However, if the estimated distance satisfies the threshold condition (e.g., if the estimated difference is less than a defined value or outside of a range of values) then the first wireless node 802 may proceed to perform the remaining steps within the fourth step 820.

The first wireless node 802 may receive one or more parallel shift pilot signals 824 from the second wireless node 804. The parallel shift pilot signals 824 may be specialized pilot signals configured for estimating parallel shift of an antenna panel or may be a general pilot signal. At a sixth step 826, the first wireless node 802 may estimate a parallel shift of the first antenna array relative to the second antenna array based on the one or more parallel shift pilot signals 824. The first wireless node 802 may then transmit the estimated parallel shift 828 to the second wireless node 804 so that the second wireless node 804 can perform an alignment compensation (seventh step 830) based on the estimated parallel shift 828.

It should be noted that in some examples, the first wireless node 802 may estimate the parallel shift between the nodes (sixth step 826) and perform an alignment compensation on its own without transmitting the estimated shift to the second wireless node 804. The alignment compensation of the seventh step 830 (whether performed by the first wireless node 802 and/or the second wireless node 804) may include one or more of operations described above in the third step 818.

The first wireless node 802 and the second wireless node may optionally perform an eighth step 832 for determining and compensating for z-axis rotations (e.g., antenna array rotations about the z-axis or reference line 706 of FIGS. 6 and 7) in the first antenna array and/or the second antenna array.

Here, the first wireless node 802 may transmit one or more z-axis rotation pilot signals 834 to the second wireless node 804. The parallel shift pilot signals 824 may be specialized pilot signals configured for estimating parallel shift of an antenna panel or may be a general pilot signal. Here, the parallel shift pilot signals 824 may be defined by a linear phase shift progression, as discussed above. The second wireless node 804 may then estimate a z-axis rotation of the second antenna array relative to the first antenna array based on an average phase difference between the plurality of pilot signals. At a ninth step 836, the second wireless node 804 may perform an alignment compensation by adjusting a z-rotation of the second antenna array and/or performing a beam forming or beam steering operation to improve z-axis alignment between the first antenna array and the second antenna array.

Figure 9:
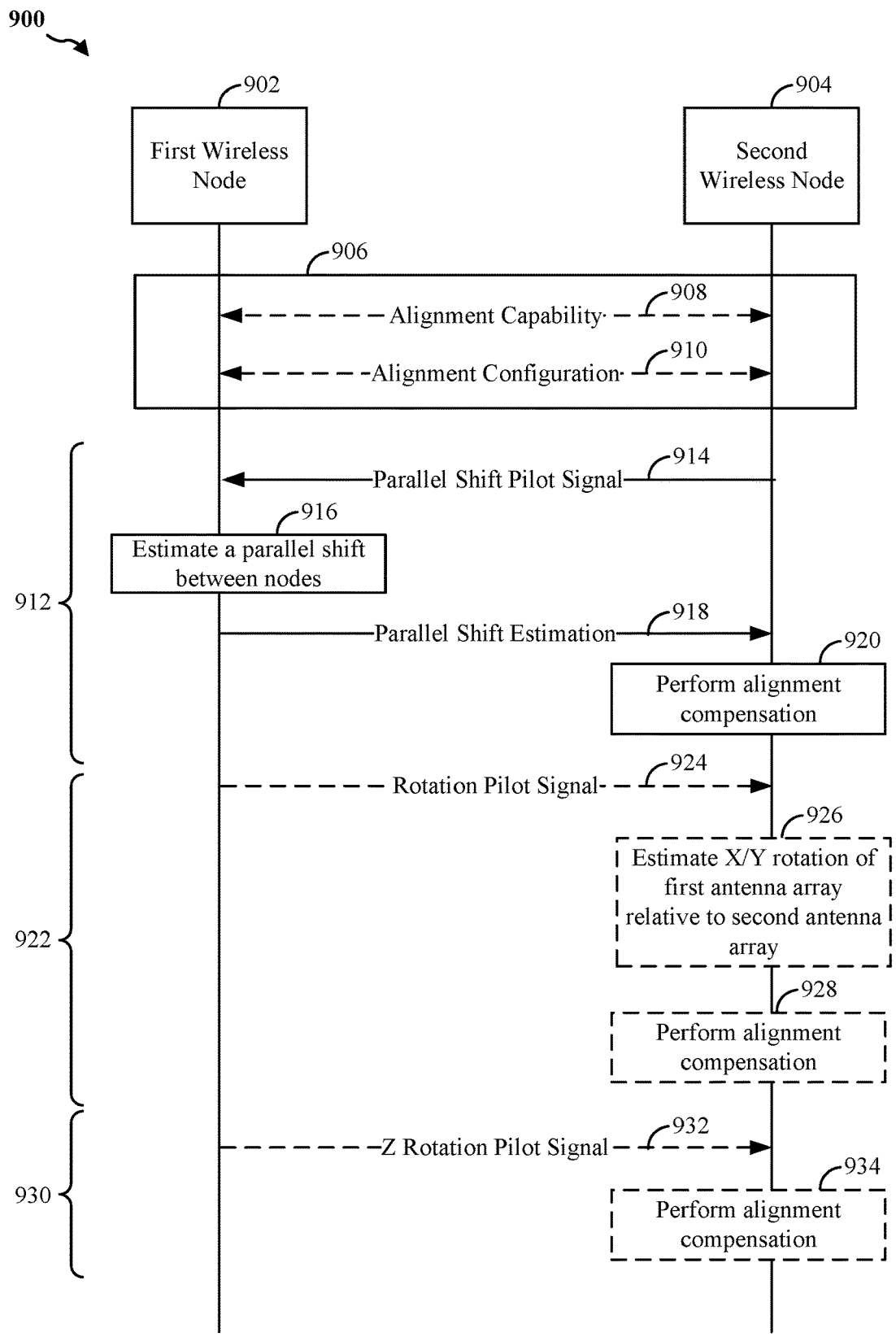
FIG. 9 is a call-flow diagram illustrating example communications between a first wireless node and a second wireless node.

FIG. 9 is a call-flow diagram 900 illustrating example communications between a first wireless node 902 (e.g., UE 104 of FIGS. 1 and 3, base station 102/180 of FIGS. 1 and 3, a relay or repeater node, etc.) and a second wireless node 904 (e.g., UE 104 of FIGS. 1 and 3, base station 102/180 of FIGS. 1 and 3, a relay or repeater node, etc.). In certain aspects, the communications are made via a LOS MIMO wireless link between the first wireless node 902 and the second wireless node 904.

The first wireless node 902 includes a first antenna array, and the second wireless node 904 include a second antenna array. Each of the antenna arrays are coupled to a transceiver and configured to transmit and receive wireless signals. In this example, the second wireless node 904 is configured to rotate its second antenna array via one or more of the z-axis, the x-axis, and the y-axis (e.g., z-axis, x-axis, and y-axis illustrated in FIGS. 6 and 7) by mechanical means such as a motor or other suitable mechanism capable of moving the wireless node or the antenna array. As such, the first wireless node 902 is not relied on to move its antenna. For example, the first wireless node 902 may be a base station serving multiple UEs and cannot perform beam steering relative to each UE, or the first antenna array of the first wireless node 902 is physically fixed in place. Accordingly, all alignment compensation in this example may be performed by the second wireless node 904.

Initially, the first wireless node 902 and the second wireless node 904 may perform initialization communications 906 to provide each other with an indication of their capabilities and/or to configure each other for correcting/compensating antenna array misalignment. The initialization communications 906 may be performed in the same manner as the initialization communications 806 of FIG. 8. For example, the initialization communications 906 may include communication of an alignment capability 908 and/or an alignment configuration 910.

The first wireless node 902 and the second wireless node 904 may perform a first step 912 for determining and compensating for parallel shifts in the first antenna array and/or the second antenna array. Note that no distance is being calculated in this example because unlike in FIG. 8, the x-axis rotation and y-axis rotation is not performed prior to the parallel shift estimation.

The first wireless node 902 may receive one or more parallel shift pilot signals 914 transmitted from the second wireless node 904. The parallel shift pilot signals 914 may be specialized pilot signals configured for estimating parallel shift of an antenna panel or may be a general pilot signal. At a second step 916, the first wireless node 902 may estimate a parallel shift of the first antenna array relative to the second antenna array based on the one or more parallel shift pilot signals 914. The first wireless node 902 may then transmit the estimated parallel shift 918 to the second wireless node 904 so that the second wireless node 904 can perform an alignment compensation (third step 920) based on the estimated parallel shift 918.

Alternatively, the second wireless node 904 may receive a parallel shift signal from the first wireless node 902, estimate a parallel shift, then perform alignment compensation at the second wireless node 904 without transmitting the estimation to the first wireless node 902.

Optionally, the first wireless node 902 and the second wireless node 904 may perform a fourth step 922 by estimating and compensating antenna array misalignment caused by x-axis and/or y-axis rotation (e.g., rotation about an x-axis or y-axis as illustrated in FIGS. 6 and 7) of the first antenna array and/or the second antenna array as described in the first step 812 of FIG. 8.

For example, the first wireless node 902 may transmit one or more rotation pilot signals 924 to the second wireless node. The second wireless node 904 may perform a fifth step 926 by estimating a first rotation of its own antenna array (e.g., the second antenna array) relative to the first antenna array of the first wireless node 902 based on the rotation pilot signals 924. The rotation may be estimated based on a phase difference between phase expected by the second wireless node 904 and the phase of a received pilot signal, or based on phase differences between multiple received pilot signals received from the first wireless node 902.

Based on the computed phase difference(s), the second wireless node 904 may perform a sixth step 928 by performing an alignment compensation of at least one of a beam or beam pair used by the second wireless node 904 and/or compensation of the second antenna array based on the estimated rotation of the second antenna array relative to the first antenna array. For example, the second wireless node 904 may use beam steering or beam forming to redirect the beam it uses for communication with the first wireless node 902 to compensate for the estimated rotation. Alternatively, or in addition, the second wireless node 904 may physically move the first antenna array to compensate and correct the estimated rotation.

As discussed in FIG. 8 above, in some examples, the second wireless node 904 may determine whether to perform the fourth step 922 again to further refine the position of the first antenna array and/or the direction of the beam.

The first wireless node 902 and the second wireless node 904 may optionally perform a seventh step 930 for determining and compensating for z-axis rotations (e.g., antenna array rotations about the z-axis or reference line 706 of FIGS. 6 and 7) in the first antenna array and/or the second antenna array.

Here, the first wireless node 902 may transmit one or more z-axis rotation pilot signals 932 to the second wireless node 904. The z-axis rotation pilot signals 932 may be specialized pilot signals configured for estimating rotation along a z-axis of an antenna panel or may be a general pilot signal. The second wireless node 904 may then estimate a z-axis rotation of the second antenna array relative to the first antenna array based on an average phase difference between the plurality of pilot signals. At a ninth step 934, the second wireless node 904 may perform an alignment compensation by adjusting a z-rotation of the second antenna array and/or performing a beam forming or beam steering operation to improve z-axis alignment between the first antenna array and the second antenna array.

Example Methods for Estimating Z-Axis Rotation

Figure 10:
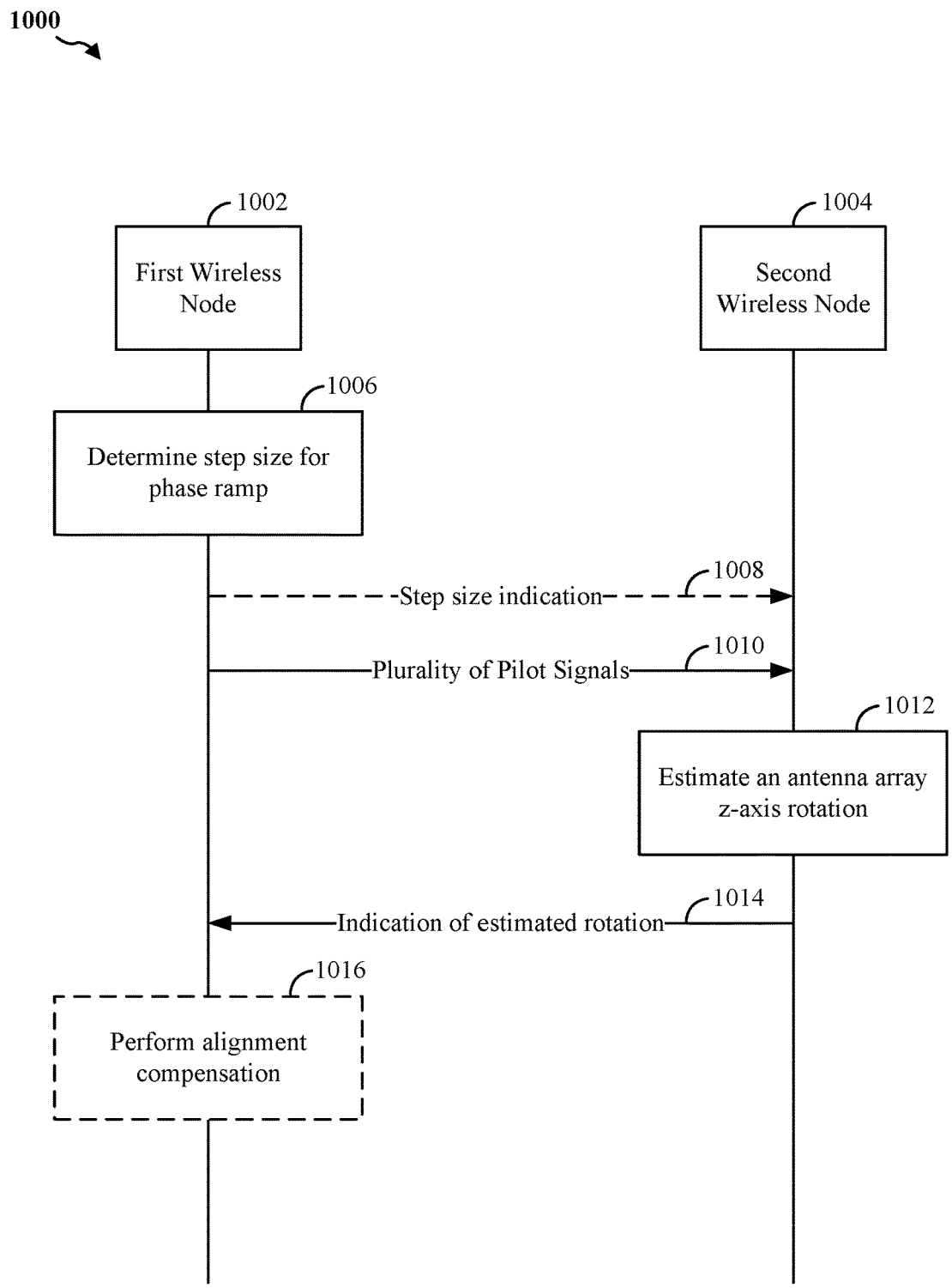
FIG. 10 is a call-flow diagram illustrating example communications between a first wireless node and a second wireless node.

FIG. 10 is a call-flow diagram illustrating example communications 1000 between a first wireless node 1002 (e.g., UE 104 of FIGS. 1 and 3, base station 102/180 of FIGS. 1 and 3, a relay or repeater node, etc.) and a second wireless node 1004 (e.g., UE 104 of FIGS. 1 and 3, base station 102/180 of FIGS. 1 and 3, a relay or repeater node, etc.). The first wireless node 1002 and the second wireless node 1004 may be any wireless communication node capable of processing wireless signals communicated over an air interface (e.g., communication between a base station and a relay, communication between a base station and a UE, sidelink/V2X communication between two UEs, etc.). In this example, the first wireless node 1002 is a transmitting device, configured to transmit pilot signals according to a phase ramp. The second wireless node 1004 is a receiving device, configured to receive the pilot signals and perform rotation estimation. In certain aspects, the communications are made via a LOS MIMO wireless link between the first wireless node 1002 and the second wireless node 1004.

The illustrated communications may be used as part of the z-axis rotation of the eighth step 832 and the seventh step 930 of FIGS. 8 and 9, respectively. At a first process 1006, the first wireless node 1002 may determine a step size ($\Delta$) for a phase ramp (e.g., a value incrementally applied to a plurality of pilot signals to generate a linear phase shift progression). In some examples, the step size may be defined in terms of radians and may be determined based on one or more of ambient noise detected by the first wireless node, a size of the antenna array used for transmitting the pilot signals by the first wireless node 1002, and/or a size of the antenna array used for receiving the pilot signals by the second wireless node 1004. In some examples, the step size may be determined as a function of a number of transmit antenna elements (N) along the x-axis that will transmit pilot signals having a phase shift according to the phase ramp. For example, the step size may be determined as: $\Delta=2\pi/N$. The first wireless node 1002 may also determine whether to transmit pilot signals using each antenna element of its antenna array or transmit the pilot signals using only a subset of the antenna elements.

In some examples, the wireless node may output a radio resource control (RRC) message for transmission, wherein the RRC message comprises an indication of the subset of the plurality of antenna elements. This way, the receiver can identify the received pilot signals as being transmitted from only a portion (less than all) of the antenna elements of the wireless node. In some examples, the RRC message may also include an indication of whether the subset of the plurality of antenna elements are located in a center of the first antenna array or in a corner of the first antenna array. That is, the RRC message may indicate a physical location of the antenna array of the wireless node that includes the subset of antenna elements used to transmit pilot signals.

In a first communication 1008, the first wireless node 1002 may optionally transmit an indication of the step size to the second wireless node 1004. Here, the transmission may be made via an RRC message. This communication may be optional if the second wireless node 1004 is already configured with the step size according to a wireless standard and/or as a step in manufacturing of the second wireless node 1004.

In a second communication 1010, the first wireless node 1002 may transmit a plurality of pilot signals to the second wireless node 1004, wherein the plurality of pilot signals are defined by a linear phase shift progression defined by the step size ($\Delta$). For example, a first group of antenna elements of the transmit antenna array may transmit pilot signals defined by a first phase shift, and a second group of antenna elements may transmit pilot signals defined by a second phase shift, where the second phase shift is equal to the first phase shift plus the step size. A third group of antenna elements may transmit pilot signals defined by a third phase shift, where the third phase shift is equal to the second phase shift plus the step size, and so on. Thus, a difference between the first phase shift and the second phase shift (and any subsequent consecutive phase shifts) is defined by the step size.

At a second process 1012, the second wireless node 1004 may estimate an antenna array rotation based on an average phase difference between the received pilot signals. For example, the second wireless node 1004 may estimate a rotation of the receive antenna array of the second wireless node 1004 relative to the transmit antenna array of the first wireless node 1002. Here, the second wireless node may estimate the slope of a phase ramp that is generated by the linear phase shift of the pilot signals by determining an average phase differential of pilot signals transmitted along the x-axis of the transmitting antenna array, and an average phase differential of pilot signals transmitted along the y-axis transmitting antenna array. That is, the second wireless node 1004 may determine a phase difference between pilot signals transmitted from adjacent elements along the x-axis and the y-axis of the transmitting antenna array.

For example, the second wireless node 1004 may calculate a first phase difference between pilot signals transmitted in the first group and pilot signals transmitted in the second group. The second wireless node 1004 may then calculate a second phase difference between pilot signals transmitted in the second group and pilot signals transmitted in the third group. The second wireless node 1004 may then calculate a third phase difference between pilot signals transmitted in the third group and pilot signals transmitted in the fourth group. The second wireless node may then calculate an average slope over the x-axis by averaging the first phase difference, the second phase difference, and the third phase difference.

Similarly, the second wireless node 1004 may calculate a fourth phase difference between pilot signals transmitted in a fifth group and pilot signals transmitted in a sixth group. The second wireless node 1004 may then calculate a fifth phase difference between pilot signals transmitted in the sixth group and pilot signals transmitted in a seventh group. The second wireless node 1004 may then calculate a sixth phase difference between pilot signals transmitted in the seventh group and pilot signals transmitted an eighth group. The second wireless node may then calculate an average slope over the y-axis by averaging the fourth phase difference, the fifth phase difference, and the sixth phase difference.

Once the average slope over the x-axis and the average slope over the y-axis have been determined, the second wireless node 1004 may determine the slope of the phase ramp by computing a trigonometric function of the two average slopes. For example, the second wireless node 1004 may estimate the slope of the phase ramp using equation 2 below:

$$\hat{\theta} = \operatorname{atan}\left(\frac{\text{slope} - x}{\text{slope} - y}\right) \quad \text{Equation 2}$$

Where: $\hat{\theta}$ is the estimated slope of the phase ramp, slope-x is the average slope over the x-axis, and slope-y is the average slope over the y-axis. Accordingly, the estimated rotation may be a function of the step size.

At a third communication 1014, the second wireless node 1004 may then transmit, to the first wireless node, the estimated slope of the phase ramp (indicative of the estimated rotation).

At a third process 1016, the first wireless node may optionally perform one or more of a mechanical compensation and/or a digital compensation to improve or resolve performance degradation caused by a z-axis misalignment of the antenna arrays of the first wireless node 1002 and the second wireless node 1004. In a first example, the first wireless node 1002 may perform a mechanical compensation by mechanically rotating its antenna array about the z-axis to align the transmitting antenna array with the receiving antenna array. In a second example, the first wireless node may perform a digital compensation by estimating a channel matrix of a communication channel used by the first wireless node 1002 and the second wireless node 1004 for communication based on the estimated rotation. Based on the channel matrix, the first wireless node 1002 may determine a singular value decomposition (SVD) in order to align a transmit beam used for wireless communication with the second wireless node. It should be noted that the alignment compensation illustrated in any of FIGS. 8-10 may include one or more of the digital compensation and the mechanical compensation described above.

Figure 11:
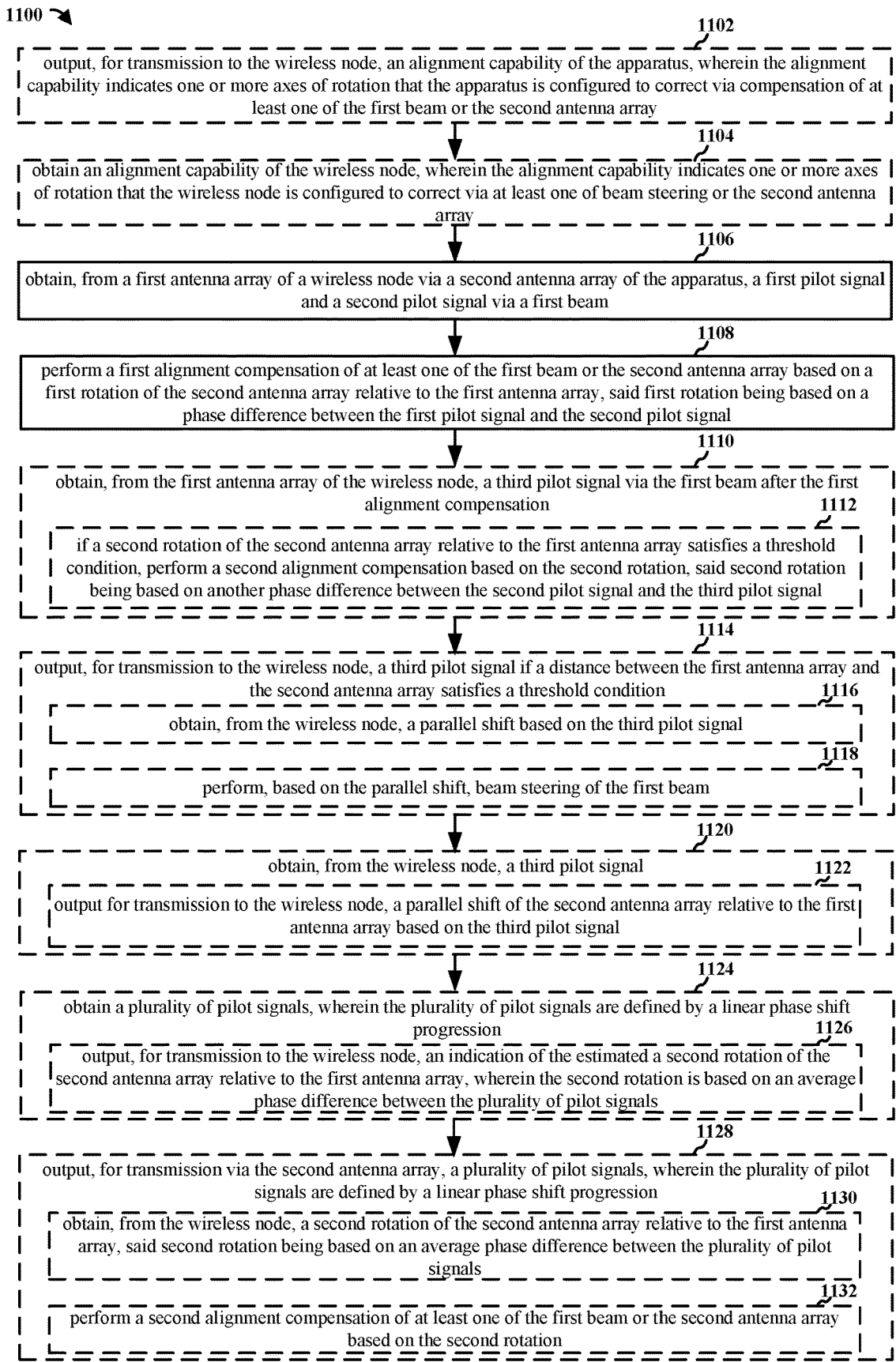
FIG. 11 is a flowchart of a method of wireless communication.

FIG. 11 is a flowchart 1100 of a method of wireless communication. The method may be performed by a first wireless node (e.g., the UE 104 or base station 102 of FIGS. 1 and 3; the apparatus 1202/1402 of FIGS. 12 and 14). At 1102, the first wireless node may optionally output, for transmission to the wireless node, an alignment capability of the apparatus, wherein the alignment capability indicates one or more axes of rotation that the apparatus is configured to correct via compensation of at least one of the first beam or the second antenna array.

At 1104, the first wireless node may optionally obtain an alignment capability of the wireless node, wherein the alignment capability indicates one or more axes of rotation that the wireless node is configured to correct via at least one of beam steering or the second antenna array.

At 1106, the first wireless node may obtain, from a first antenna array of a wireless node via a second antenna array of the apparatus, a first pilot signal and a second pilot signal via a first beam.

At 1108, the first wireless node may perform a first alignment compensation of at least one of the first beam or the second antenna array based on a first rotation of the second antenna array relative to the first antenna array, said first rotation being based on a phase difference between the first pilot signal and the second pilot signal.

At 1110, the first wireless node may obtain, from the first antenna array of the wireless node, a third pilot signal via the first beam after the first alignment compensation.

At 1112, the first wireless node may if a second rotation of the second antenna array relative to the first antenna array satisfies a threshold condition, perform a second alignment compensation based on the second rotation, said second rotation being based on another phase difference between the second pilot signal and the third pilot signal.

At 1114, the first wireless node may output, for transmission to the wireless node, a third pilot signal if a distance between the first antenna array and the second antenna array satisfies a threshold condition.

At 1116, the first wireless node may obtain, from the wireless node, a parallel shift based on the third pilot signal.

At 1118, the first wireless node may perform, based on the parallel shift, beam steering of the first beam.

At 1120, the first wireless node may obtain, from the wireless node, a third pilot signal.

At 1122, the first wireless node may output for transmission to the wireless node, a parallel shift of the second antenna array relative to the first antenna array based on the third pilot signal.

At 1124, the first wireless node may obtain a plurality of pilot signals, wherein the plurality of pilot signals are defined by a linear phase shift progression.

At 1126, the first wireless node may output, for transmission to the wireless node, an indication of the estimated a second rotation of the second antenna array relative to the first antenna array, wherein the second rotation is based on an average phase difference between the plurality of pilot signals.

At 1128, the first wireless node may output, for transmission via the second antenna array, a plurality of pilot signals, wherein the plurality of pilot signals are defined by a linear phase shift progression.

At 1130, the first wireless node may obtain, from the wireless node, a second rotation of the second antenna array relative to the first antenna array, said second rotation being based on an average phase difference between the plurality of pilot signals.

At 1132, the first wireless node may perform a second alignment compensation of at least one of the first beam or the second antenna array based on the second rotation.

In certain aspects, the first alignment compensation of the first beam comprises beam steering the first beam to compensate for the first rotation, and wherein the first alignment compensation of the second antenna array comprises rotating the second antenna array about an axis parallel to a planar surface of the second antenna array.

In certain aspects, the distance satisfies the threshold condition when the distance is equal to a defined value.

In certain aspects, the first rotation is a rotation about an axis parallel to a planar surface of the second antenna array, and wherein the second rotation is a rotation about an axis perpendicular to the planar surface of the second antenna array.

In certain aspects, the alignment capability of the wireless node is obtained via a radio resource control (RRC) message.

Figure 12:
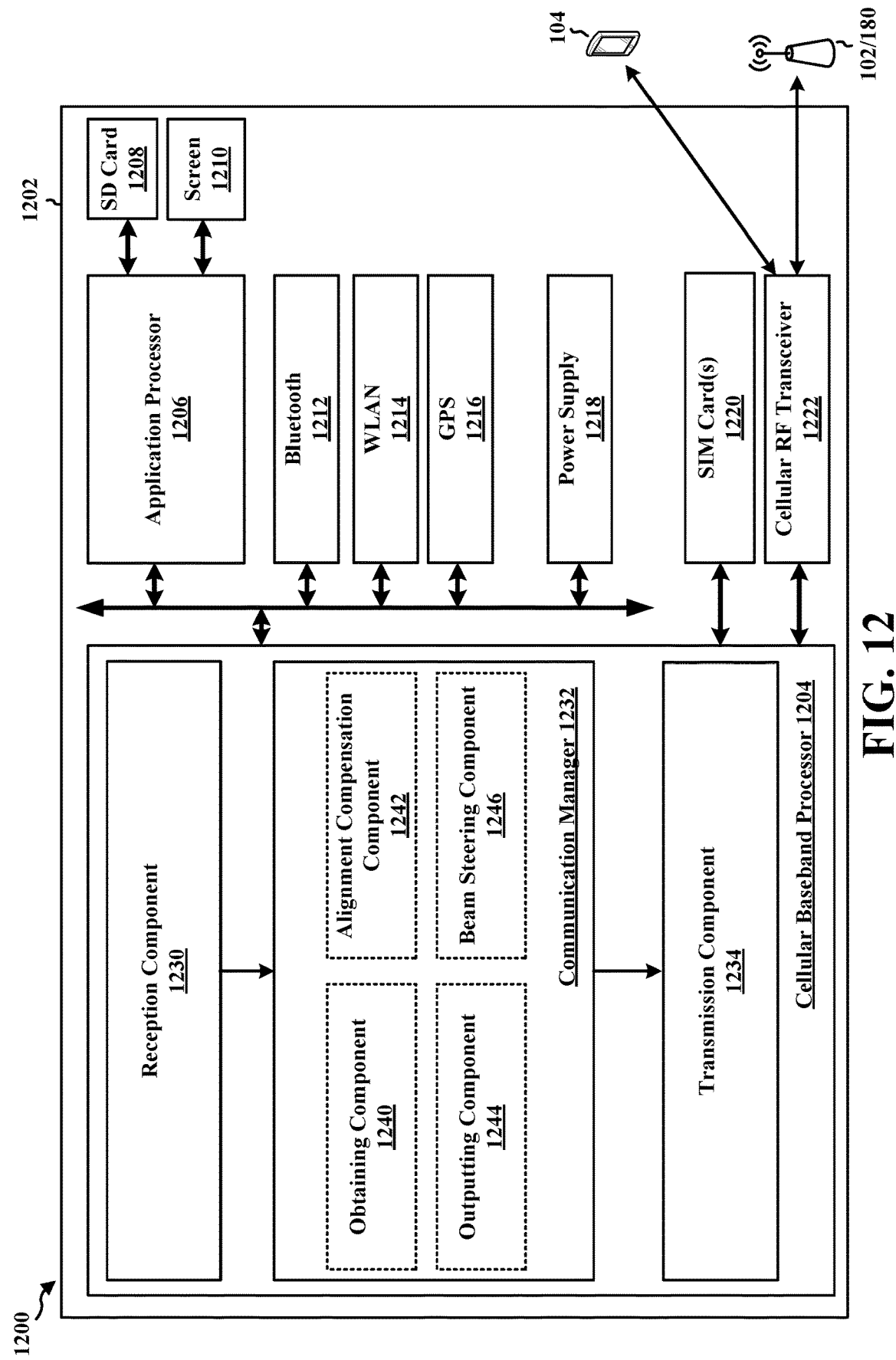
FIG. 12 is a diagram illustrating an example of a hardware implementation for an example apparatus.

FIG. 12 is a diagram 1200 illustrating an example of a hardware implementation for an apparatus 1202. The apparatus 1202 may be configured as a base station or a UE, and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 104 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., 104 of FIGS. 1 and 3) and include the aforediscussed additional modules of the apparatus 1202. The baseband unit 1204 may be a component of the BS 102/180 and may include the memory 376 and/or at least one of the TX processor 316, the RX processor 370, and the controller/processor 375.

The communication manager 1232 includes an obtaining component 1240 that is configured to obtain, from a first antenna array of a wireless node, a first pilot signal and a second pilot signal via a first beam, e.g., as described in connection with 1106 of FIG. 11.

The communication manager 1232 further includes an alignment compensation component 1242 that performs a first alignment compensation of at least one of the first beam or the second antenna array based on a first rotation of a second antenna array relative to the first antenna array, said first rotation being based on a phase difference between the first pilot signal and the second pilot signal, e.g., as described in connection with 1108 of FIG. 11.

The communication manager 1232 further includes an outputting component 1244 that outputs, for transmission to the wireless node, an alignment capability of the apparatus, wherein the alignment capability indicates one or more axes of rotation that the apparatus is configured to correct via compensation of at least one of the first beam or the second antenna array, e.g., as described in connection with 1102 of FIG. 11.

In some examples, the obtaining component 1240 is configured to obtain an alignment capability of the wireless node, wherein the alignment capability indicates one or more axes of rotation that the wireless node is configured to correct via at least one of beam steering or the second antenna array, e.g., as described in connection with 1104 of FIG. 11.

In some examples, the obtaining component 1240 is configured to obtain, from the first antenna array of the wireless node, a third pilot signal via the first beam after the first alignment compensation, e.g., as described in connection with 1110 of FIG. 11.

In some examples, the alignment compensation component 1242 is configured to perform, if a second rotation of the second antenna array relative to the first antenna array satisfies a threshold condition, a second alignment compensation based on the second rotation, said second rotation being based on another phase difference between the second pilot signal and the third pilot signal, e.g., as described in connection with 1112 of FIG. 11.

In some examples, the outputting component 1244 is configured to output, for transmission to the wireless node, a third pilot signal if a distance between the first antenna array and the second antenna array satisfies a threshold condition, e.g., as described in connection with 1114 of FIG. 11.

In some examples, the obtaining component 1240 is configured to obtain, from the wireless node, a parallel shift based on the third pilot signal, e.g., as described in connection with 1116 of FIG. 11.

The communication manager 1232 further includes beam steering component 1246 that performs, based on the parallel shift, beam steering of the first beam, e.g., as described in connection with 1118 of FIG. 11.

In some examples, the obtaining component 1240 is configured to obtain, from the wireless node, a third pilot signal, e.g., as described in connection with 1120 of FIG. 11.

In some examples, the outputting component 1244 is configured to output for transmission to the wireless node, a parallel shift of the second antenna array relative to the first antenna array based on the third pilot signal, e.g., as described in connection with 1122 of FIG. 11.

In some examples, the obtaining component 1240 is configured to obtain a plurality of pilot signals, wherein the plurality of pilot signals are defined by a linear phase shift progression, e.g., as described in connection with 1124 of FIG. 11.

In some examples, the outputting component 1244 is configured to output, for transmission to the wireless node, an indication of the estimated a second rotation of the second antenna array relative to the first antenna array, wherein the second rotation is based on an average phase difference between the plurality of pilot signals, e.g., as described in connection with 1126 of FIG. 11.

In some examples, the outputting component 1244 is configured to output, for transmission via the second antenna array, a plurality of pilot signals, wherein the plurality of pilot signals are defined by a linear phase shift progression, e.g., as described in connection with 1128 of FIG. 11.

In some examples, the obtaining component 1240 is configured to obtain, from the wireless node, a second rotation of the second antenna array relative to the first antenna array, said second rotation being based on an average phase difference between the plurality of pilot signals, e.g., as described in connection with 1130 of FIG. 11.

In some examples, the alignment compensation component 1242 is configured to perform a second alignment compensation of at least one of the first beam or the second antenna array based on the second rotation, e.g., as described in connection with 1132 of FIG. 11.

The apparatus may include additional components that perform each of the blocks of the algorithm in the aforementioned flowchart of FIG. 11. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for outputting, for transmission to the wireless node, an alignment capability of the apparatus, wherein the alignment capability indicates one or more axes of rotation that the apparatus is configured to correct via compensation of at least one of the first beam or the second antenna array; means for obtaining an alignment capability of the wireless node, wherein the alignment capability indicates one or more axes of rotation that the wireless node is configured to correct via at least one of beam steering or the second antenna array; means for obtaining, from a first antenna array of a wireless node via a second antenna array of the apparatus, a first pilot signal and a second pilot signal via a first beam; means for performing a first alignment compensation of at least one of the first beam or the second antenna array based on a first rotation of the second antenna array relative to the first antenna array, said first rotation being based on a phase difference between the first pilot signal and the second pilot signal; means for obtaining, from the first antenna array of the wireless node, a third pilot signal via the first beam after the first alignment compensation; means for, if a second rotation of the second antenna array relative to the first antenna array satisfies a threshold condition, performing a second alignment compensation based on the second rotation, said second rotation being based on another phase difference between the second pilot signal and the third pilot signal; means for outputting, for transmission to the wireless node, a third pilot signal if a distance between the first antenna array and the second antenna array satisfies a threshold condition; means for obtaining, from the wireless node, a parallel shift based on the third pilot signal; means for performing, based on the parallel shift, beam steering of the first beam; means for obtaining, from the wireless node, a third pilot signal; means for outputting for transmission to the wireless node, a parallel shift of the second antenna array relative to the first antenna array based on the third pilot signal; means for obtaining a plurality of pilot signals, wherein the plurality of pilot signals are defined by a linear phase shift progression; means for outputting, for transmission to the wireless node, an indication of the estimated a second rotation of the second antenna array relative to the first antenna array, wherein the second rotation is based on an average phase difference between the plurality of pilot signals; means for outputting, for transmission via the second antenna array, a plurality of pilot signals, wherein the plurality of pilot signals are defined by a linear phase shift progression; means for obtaining, from the wireless node, a second rotation of the second antenna array relative to the first antenna array, said second rotation being based on an average phase difference between the plurality of pilot signals; means for performing a second alignment compensation of at least one of the first beam or the second antenna array based on the second rotation.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359; or the memory 376 and/or at least one of the TX processor 316, the RX processor 370, and the controller/processor 375. As such, in one configuration, the aforementioned means may be the TX Processor 368, the RX Processor 356, and the controller/processor 359; or the memory 376 and/or at least one of the TX processor 316, the RX processor 370, and the controller/processor 375 configured to perform the functions recited by the aforementioned means.

Figure 13:
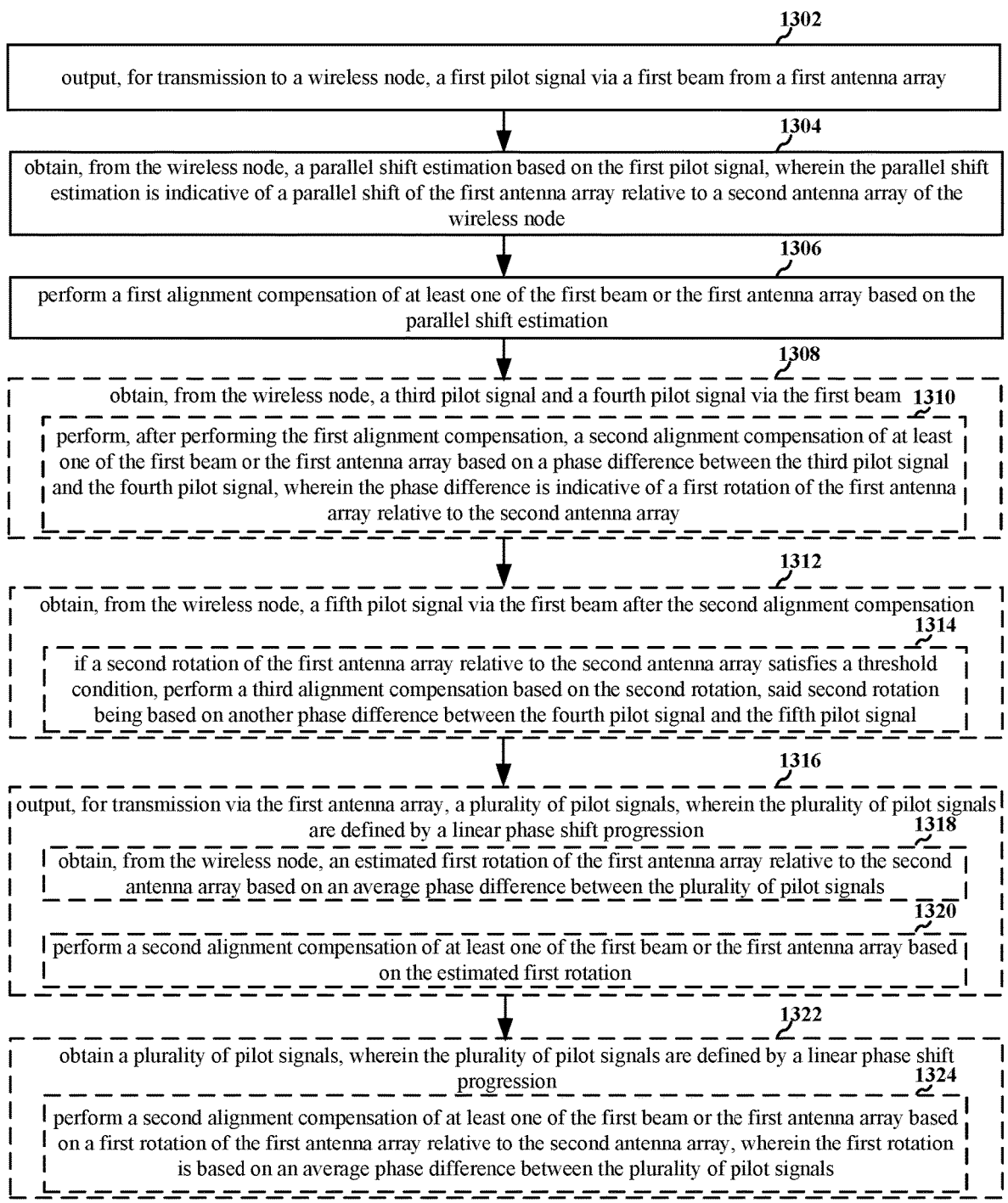
FIG. 13 is a flowchart of a method of wireless communication.

FIG. 13 is a flowchart 1300 of a method of wireless communication. The method may be performed by a first wireless node (e.g., the UE 104 or base station 102 of FIGS. 1 and 3; the apparatus 1202/1402 of FIGS. 12 and 14). At 1302, the first wireless node may output, for transmission to a base station, a first pilot signal via a first beam from a first antenna array.

At 1304, the first wireless node may obtain, from the base station, a parallel shift estimation based on the first pilot signal, wherein the parallel shift estimation is indicative of a parallel shift of the first antenna array relative to a second antenna array of the base station.

At 1306, the first wireless node may perform a first alignment compensation of at least one of the first beam or the first antenna array based on the parallel shift estimation.

At 1308, the first wireless node may obtain, from the base station, a third pilot signal and a fourth pilot signal via the first beam.

At 1310, the first wireless node may perform, after performing the first alignment compensation, a second alignment compensation of at least one of the first beam or the first antenna array based on a phase difference between the third pilot signal and the fourth pilot signal, wherein the phase difference is indicative of a first rotation of the first antenna array relative to the second antenna array.

At 1312, the first wireless node may obtain, from the base station, a fifth pilot signal via the first beam after the second alignment compensation.

At 1314, the first wireless node may if a second rotation of the first antenna array relative to the second antenna array satisfies a threshold condition, perform a third alignment compensation based on the second rotation, said second rotation being based on another phase difference between the fourth pilot signal and the fifth pilot signal.

At 1316, the first wireless node may output, for transmission via the first antenna array, a plurality of pilot signals, wherein the plurality of pilot signals are defined by a linear phase shift progression.

At 1318, the first wireless node may obtain, from the base station, an estimated first rotation of the first antenna array relative to the second antenna array based on an average phase difference between the plurality of pilot signals.

At 1320, the first wireless node may perform a second alignment compensation of at least one of the first beam or the first antenna array based on the estimated first rotation.

At 1322, the first wireless node may obtain a plurality of pilot signals, wherein the plurality of pilot signals are defined by a linear phase shift progression.

At 1324, the first wireless node may perform a second alignment compensation of at least one of the first beam or the first antenna array based on a first rotation of the first antenna array relative to the second antenna array, wherein the first rotation is based on an average phase difference between the plurality of pilot signals.

In certain aspects, the first alignment compensation of the first beam comprises beam steering the first beam to compensate for the parallel shift of the first antenna array, and wherein the first alignment compensation of the first antenna array comprises rotating the first antenna array about an axis parallel to a planar surface of the first antenna array.

In certain aspects, the first rotation is a rotation about an axis perpendicular to a planar surface of the first antenna array.

Figure 14:
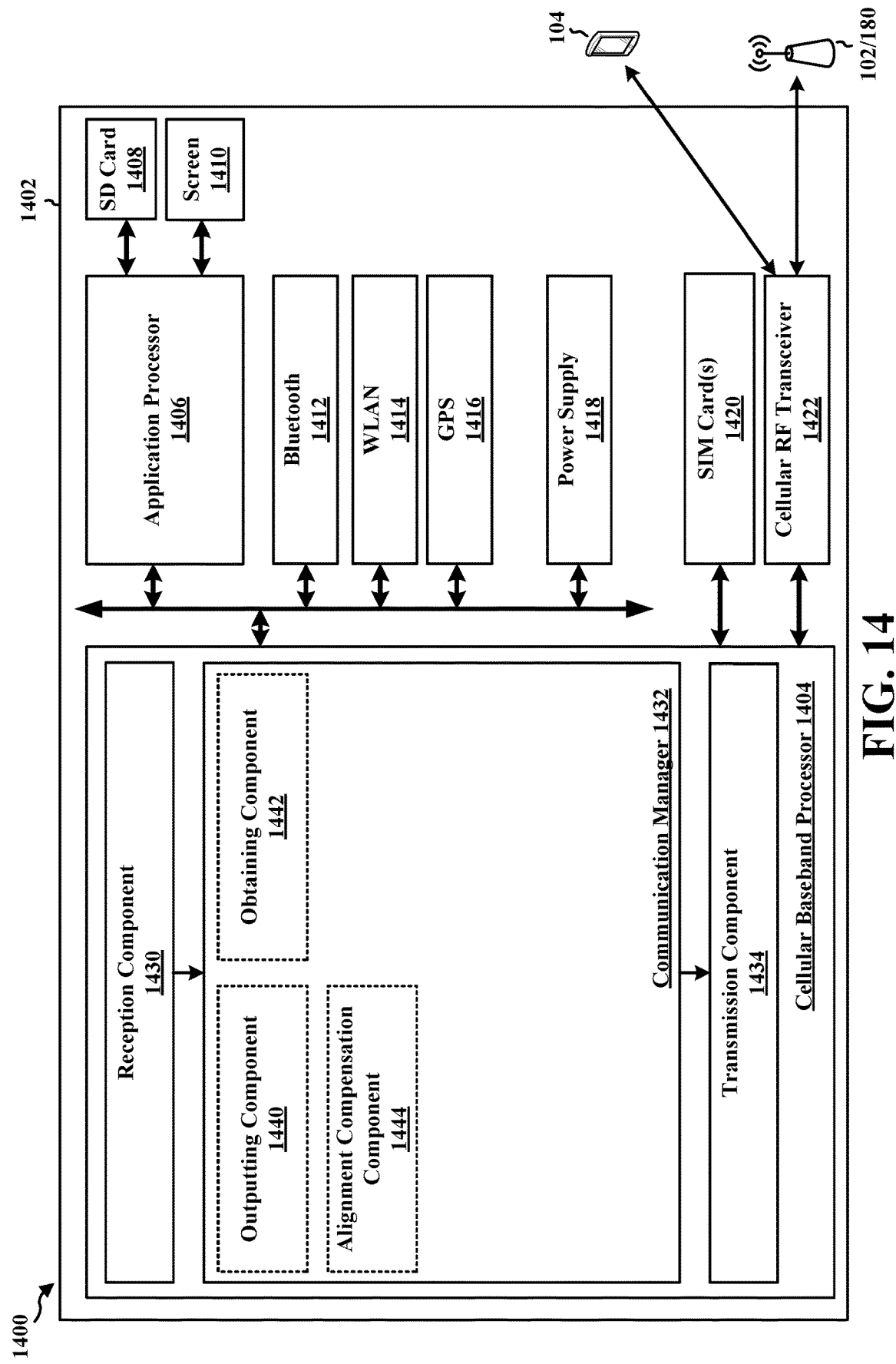
FIG. 14 is a diagram illustrating another example of a hardware implementation for another example apparatus.

FIG. 14 is a diagram 1400 illustrating an example of a hardware implementation for an apparatus 1402. The apparatus 1402 may be configured as a base station or a UE, and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 104 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., 104 of FIGS. 1 and 3) and include the aforediscussed additional modules of the apparatus 1402. The baseband unit 1404 may be a component of the BS 102/180 and may include the memory 376 and/or at least one of the TX processor 316, the RX processor 370, and the controller/processor 375.

The communication manager 1432 includes an outputting component 1440 configured to output, for transmission to a wireless node, a first pilot signal via a first beam from a first antenna array, e.g., as described in connection with 1302 of FIG. 13.

The communication manager 1432 further includes an obtaining component 1442 configured to obtain, from the wireless node, a parallel shift estimation based on the first pilot signal, wherein the parallel shift estimation is indicative of a parallel shift of the first antenna array relative to a second antenna array of the wireless node, e.g., as described in connection with 1304 of FIG. 13.

The communication manager 1432 further includes an alignment compensation component 1444 is configured to perform a first alignment compensation of at least one of the first beam or the first antenna array based on the parallel shift estimation, e.g., as described in connection with 1306 of FIG. 13.

In certain aspects, the obtaining component 1442 is configured to obtain, from the wireless node, a third pilot signal and a fourth pilot signal via the first beam, e.g., as described in connection with 1308 of FIG. 13.

In certain aspects, the alignment compensation component 1444 is configured to perform, after performing the first alignment compensation, a second alignment compensation of at least one of the first beam or the first antenna array based on a phase difference between the third pilot signal and the fourth pilot signal, wherein the phase difference is indicative of a first rotation of the first antenna array relative to the second antenna array, e.g., as described in connection with 1310 of FIG. 13.

In certain aspects, the obtaining component 1442 is configured to obtain, from the wireless node, a fifth pilot signal via the first beam after the second alignment compensation, e.g., as described in connection with 1312 of FIG. 13.

In certain aspects, the alignment compensation component 1444 is configured to, if a second rotation of the first antenna array relative to the second antenna array satisfies a threshold condition, perform a third alignment compensation based on the second rotation, said second rotation being based on another phase difference between the fourth pilot signal and the fifth pilot signal, e.g., as described in connection with 1314 of FIG. 13.

In certain aspects, the outputting component 1440 is configured to output, for transmission via the first antenna array, a plurality of pilot signals, wherein the plurality of pilot signals are defined by a linear phase shift progression, e.g., as described in connection with 1316 of FIG. 13.

In certain aspects, the obtaining component 1442 is configured to obtain, from the wireless node, an estimated first rotation of the first antenna array relative to the second antenna array based on an average phase difference between the plurality of pilot signals, e.g., as described in connection with 1318 of FIG. 13.

In certain aspects, the alignment compensation component 1444 is configured to perform a second alignment compensation of at least one of the first beam or the first antenna array based on the estimated first rotation, e.g., as described in connection with 1320 of FIG. 13.

In certain aspects, the obtaining component 1442 is configured to obtain a plurality of pilot signals, wherein the plurality of pilot signals are defined by a linear phase shift progression, e.g., as described in connection with 1322 of FIG. 13.

In certain aspects, the alignment compensation component 1444 is configured to perform a second alignment compensation of at least one of the first beam or the first antenna array based on a first rotation of the first antenna array relative to the second antenna array, wherein the first rotation is based on an average phase difference between the plurality of pilot signals, e.g., as described in connection with 1324 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for outputting, for transmission to a wireless node, a first pilot signal via a first beam from a first antenna array; means for obtaining, from the wireless node, a parallel shift estimation based on the first pilot signal, wherein the parallel shift estimation is indicative of a parallel shift of the first antenna array relative to a second antenna array of the wireless node; means for performing a first alignment compensation of at least one of the first beam or the first antenna array based on the parallel shift estimation; means for obtaining, from the wireless node, a third pilot signal and a fourth pilot signal via the first beam; means for performing, after performing the first alignment compensation, a second alignment compensation of at least one of the first beam or the first antenna array based on a phase difference between the third pilot signal and the fourth pilot signal, wherein the phase difference is indicative of a first rotation of the first antenna array relative to the second antenna array; means for obtaining, from the wireless node, a fifth pilot signal via the first beam after the second alignment compensation; means for if a second rotation of the first antenna array relative to the second antenna array satisfies a threshold condition, perform a third alignment compensation based on the second rotation, said second rotation being based on another phase difference between the fourth pilot signal and the fifth pilot signal; means for outputting, for transmission via the first antenna array, a plurality of pilot signals, wherein the plurality of pilot signals are defined by a linear phase shift progression; means for obtaining, from the wireless node, an estimated first rotation of the first antenna array relative to the second antenna array based on an average phase difference between the plurality of pilot signals; means for performing a second alignment compensation of at least one of the first beam or the first antenna array based on the estimated first rotation; means for obtaining a plurality of pilot signals, wherein the plurality of pilot signals are defined by a linear phase shift progression; means for performing a second alignment compensation of at least one of the first beam or the first antenna array based on a first rotation of the first antenna array relative to the second antenna array, wherein the first rotation is based on an average phase difference between the plurality of pilot signals.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

ADDITIONAL CONSIDERATIONS

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean as "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method for wireless communications at a first wireless node, comprising: obtaining, from a first antenna array of a second wireless node via a second antenna array of the first wireless node, a first pilot signal and a second pilot signal via a first beam; and performing a first alignment compensation of at least one of the first beam or the second antenna array based on a first rotation of the second antenna array relative to the first antenna array, said first rotation being based on a phase difference between the first pilot signal and the second pilot signal.

Example 2 is the method of example 1, wherein the first alignment compensation of the first beam comprises beam steering the first beam to compensate for the first rotation, and wherein the first alignment compensation of the second antenna array comprises rotating the second antenna array about an axis parallel to a planar surface of the second antenna array.

Example 3 is the method of any of examples 1 and 2, wherein the method further comprises: obtaining, from the first antenna array of the second wireless node, a third pilot signal via the first beam after the first alignment compensation; and if a second rotation of the second antenna array relative to the first antenna array satisfies a threshold condition, performing a second alignment compensation based on the second rotation, said second rotation being based on another phase difference between the second pilot signal and the third pilot signal.

Example 4 is the method of any of examples 1-3, wherein the method further comprises: outputting, for transmission to the second wireless node, a third pilot signal if a distance between the first antenna array and the second antenna array satisfies a threshold condition; obtaining, from the second wireless node, a parallel shift based on the third pilot signal; and performing, based on the parallel shift, beam steering of the first beam.

Example 5 is the method of example 4, wherein the distance satisfies the threshold condition when the distance is equal to a defined value.

Example 6 is the method of any of examples 1-5, wherein the method further comprises: obtaining, from the second wireless node, a third pilot signal; and outputting for transmission to the second wireless node, a parallel shift of the second antenna array relative to the first antenna array based on the third pilot signal.

Example 7 is the method of any of examples 1-6, wherein the method further comprises: outputting, for transmission via the second antenna array, a plurality of pilot signals, wherein the plurality of pilot signals are defined by a linear phase shift progression; obtaining, from the second wireless node, a second rotation of the second antenna array relative to the first antenna array, said second rotation being based on an average phase difference between the plurality of pilot signals; and performing a second alignment compensation of at least one of the first beam or the second antenna array based on the second rotation.

Example 8 is the method of any of examples 3 and 7, wherein the first rotation is a rotation about an axis parallel to a planar surface of the second antenna array, and wherein the second rotation is a rotation about an axis perpendicular to the planar surface of the second antenna array.

Example 9 is the method of any of examples 1-8, wherein the method further comprises: obtaining a plurality of pilot signals, wherein the plurality of pilot signals are defined by a linear phase shift progression; and outputting, for transmission to the second wireless node, an indication of a second rotation of the second antenna array relative to the first antenna array, wherein the second rotation is based on an average phase difference between the plurality of pilot signals.

Example 10 is the method of any of examples 1-9, wherein the method further comprises: outputting, for transmission to the second wireless node, an alignment capability of the first wireless node, wherein the alignment capability indicates one or more axes of rotation that the first wireless node is configured to correct via compensation of at least one of the first beam or the second antenna array.

Example 11 is the method of any of examples 1-10, wherein the method further comprises: obtaining an alignment capability of the second wireless node, wherein the alignment capability indicates one or more axes of rotation that the second wireless node is configured to correct via at least one of beam steering or the second antenna array.

Example 12 is the method of any of examples 10 and 11, wherein the alignment capability of the wireless node is obtained via a radio resource control (RRC) message.

Example 13 is a method for wireless communications at a first wireless node, comprising: outputting, for transmission to a second wireless node, a first pilot signal via a first beam from a first antenna array; obtaining, from the second wireless node, a parallel shift based on the first pilot signal, wherein the parallel shift is indicative of a parallel shift of the first antenna array relative to a second antenna array of the second wireless node; and performing a first alignment compensation of at least one of the first beam or the first antenna array based on the parallel shift.

Example 14 is the method of example 13, wherein the first alignment compensation of the first beam comprises beam steering the first beam to compensate for the parallel shift of the first antenna array, and wherein the first alignment compensation of the first antenna array comprises rotating the first antenna array about an axis parallel to a planar surface of the first antenna array.

Example 15 is the method of any of examples 13 and 14, wherein the method further comprises: obtaining, from the second wireless node, a third pilot signal and a fourth pilot signal via the first beam; and performing, after performing the first alignment compensation, a second alignment compensation of at least one of the first beam or the first antenna array based on a phase difference between the third pilot signal and the fourth pilot signal, wherein the phase difference is indicative of a first rotation of the first antenna array relative to the second antenna array.

Example 16 is the method of example 15, wherein the method further comprises: obtaining, from the second wireless node, a fifth pilot signal via the first beam after the second alignment compensation; and if a second rotation of the first antenna array relative to the second antenna array satisfies a threshold condition, performing a third alignment compensation based on the second rotation, said second rotation being based on another phase difference between the fourth pilot signal and the fifth pilot signal.

Example 17 is the method of any of examples 13-16, wherein the method further comprises: outputting, for transmission via the first antenna array, a plurality of pilot signals, wherein the plurality of pilot signals are defined by a linear phase shift progression; obtaining, from the second wireless node, a first rotation of the first antenna array relative to the second antenna array based on an average phase difference between the plurality of pilot signals; and performing a second alignment compensation of at least one of the first beam or the first antenna array based on the first rotation.

Example 18 is the method of any of examples 15 and 17, wherein the first rotation is a rotation about an axis perpendicular to a planar surface of the first antenna array.

Example 19 is the method of any of examples 13-18, wherein the method further comprises obtaining a plurality of pilot signals, wherein the plurality of pilot signals are defined by a linear phase shift progression; and performing a second alignment compensation of at least one of the first beam or the first antenna array based on a first rotation of the first antenna array relative to the second antenna array, wherein the first rotation is based on an average phase difference between the plurality of pilot signals.

Example 20 is a first wireless node comprising: a transceiver; a memory comprising instructions; and one or more processors configured to execute the instructions to cause the first wireless node to perform a method in accordance with any one of examples 1-12, wherein the transceiver is configured to: receive, from a first antenna array of a second wireless node via a second antenna array of the first wireless node, a first pilot signal and a second pilot signal via a first beam.

Example 21 is a first wireless node, comprising: a transceiver; a memory comprising instructions; and one or more processors configured to execute the instructions and cause the first wireless node to perform a method in accordance with any one of examples 13-19, wherein the transceiver is configured to: transmit, to a second wireless node, a first pilot signal via a first beam from a first antenna array; and receive, from the wireless node, a parallel shift based on the first pilot signal, wherein the parallel shift is indicative of a parallel shift of the first antenna array relative to a second antenna array of the second wireless node.

Example 22 is an apparatus for wireless communications, comprising means for performing a method in accordance with any one of examples 1-12.

Example 23 is an apparatus for wireless communications, comprising means for performing a method in accordance with any one of examples 13-19.

Example 24 is a non-transitory computer-readable medium comprising instructions that, when executed by an apparatus, cause the apparatus to perform a method in accordance with any one of examples 1-12.

Example 25 is a non-transitory computer-readable medium comprising instructions that, when executed by an apparatus, cause the apparatus to perform a method in accordance with any one of examples 13-19.

Example 26 is an apparatus for wireless communications, comprising: a memory comprising instructions; and one or more processors configured to execute the instructions to cause the apparatus to perform a method in accordance with any one of examples 1-12.

Example 27 is apparatus for wireless communications, comprising: a memory comprising instructions; and one or more processors configured to execute the instructions to cause the apparatus to perform a method in accordance with any one of examples 13-19.

What is claimed is:

1. An apparatus configured for wireless communication, comprising:
   one or more memories comprising instructions; and
   one or more processors configured to execute the instructions and cause the apparatus to:
      obtain, from a first antenna array of a wireless node via a second antenna array of the apparatus, a first pilot signal and a second pilot signal via a first beam, wherein each of the first pilot signal and the second pilot signal is one of: a demodulation reference signal (DM-RS), a sounding reference signal (SRS), a channel state information reference signal (CSI-RS), a beam measurement reference signal (BRS), a beam refinement reference signal (BRRS), or a phase tracking reference signal (PT-RS); and
      perform a first alignment compensation of at least one of the first beam or the second antenna array based on a first rotation of the second antenna array relative to the first antenna array, said first rotation being based on a phase difference between the first pilot signal and the second pilot signal.

2. The apparatus of claim 1, wherein the first alignment compensation of the first beam comprises beam steering the first beam to compensate for the first rotation, and wherein the first alignment compensation of the second antenna array comprises rotating the second antenna array about an axis parallel to a planar surface of the second antenna array.

3. The apparatus of claim 1, wherein the one or more processors are further configured to cause the apparatus to:
   obtain, from the first antenna array of the wireless node, a third pilot signal via the first beam after the first alignment compensation; and
   if a second rotation of the second antenna array relative to the first antenna array satisfies a threshold condition, perform a second alignment compensation based on the second rotation, said second rotation being based on another phase difference between the second pilot signal and the third pilot signal.

4. The apparatus of claim 1, wherein the one or more processors are further configured to cause the apparatus to:
   output, for transmission to the wireless node, a third pilot signal if a distance between the first antenna array and the second antenna array satisfies a threshold condition;
   obtain, from the wireless node, a parallel shift based on the third pilot signal; and
   perform, based on the parallel shift, beam steering of the first beam.

5. The apparatus of claim 4, wherein the distance satisfies the threshold condition when the distance is equal to a defined value.

6. The apparatus of claim 1, wherein the one or more processors are further configured to cause the apparatus to:
   obtain, from the wireless node, a third pilot signal; and
   output for transmission to the wireless node, a parallel shift of the second antenna array relative to the first antenna array based on the third pilot signal.

7. The apparatus of claim 1, wherein the one or more processors are further configured to cause the apparatus to:
   output, for transmission via the second antenna array, a plurality of pilot signals, wherein the plurality of pilot signals are defined by a linear phase shift progression;
   obtain, from the wireless node, a second rotation of the second antenna array relative to the first antenna array, said second rotation being based on an average phase difference between the plurality of pilot signals; and
   perform a second alignment compensation of at least one of the first beam or the second antenna array based on the second rotation.

8. The apparatus of claim 7, wherein the first rotation is a rotation about an axis parallel to a planar surface of the second antenna array, and wherein the second rotation is a rotation about an axis perpendicular to the planar surface of the second antenna array.

9. The apparatus of claim 1, wherein the one or more processors are further configured to cause the apparatus to:
   obtain a plurality of pilot signals, wherein the plurality of pilot signals are defined by a linear phase shift progression; and
   output, for transmission to the wireless node, an indication of a second rotation of the second antenna array relative to the first antenna array, wherein the second rotation is based on an average phase difference between the plurality of pilot signals.

10. The apparatus of claim 1, wherein the one or more processors are further configured to cause the apparatus to:
    output, for transmission to the wireless node, an alignment capability of the apparatus, wherein the alignment capability indicates one or more axes of rotation that the apparatus is configured to correct via compensation of at least one of the first beam or the second antenna array.

11. The apparatus of claim 1, wherein the one or more processors are further configured to cause the apparatus to:
obtain an alignment capability of the wireless node, wherein the alignment capability indicates one or more axes of rotation that the wireless node is configured to correct via at least one of beam steering or the second antenna array.

12. The apparatus of claim 11, wherein the alignment capability of the wireless node is obtained via a radio resource control (RRC) message.

13. A method for wireless communications at a first wireless node, comprising:
obtaining, from a first antenna array of a second wireless node via a second antenna array of the first wireless node, a first pilot signal and a second pilot signal via a first beam, wherein each of the first pilot signal and the second pilot signal is one of: a demodulation reference signal (DM-RS), a sounding reference signal (SRS), a channel state information reference signal (CSI-RS), a beam measurement reference signal (BRS), a beam refinement reference signal (BRRS), or a phase tracking reference signal (PT-RS); and
performing a first alignment compensation of at least one of the first beam or the second antenna array based on a first rotation of the second antenna array relative to the first antenna array, said first rotation being based on a phase difference between the first pilot signal and the second pilot signal.

14. The method of claim 13, wherein the first alignment compensation of the first beam comprises beam steering the first beam to compensate for the first rotation, and wherein the first alignment compensation of the second antenna array comprises rotating the second antenna array about an axis parallel to a planar surface of the second antenna array.

15. The method of claim 13, wherein the method further comprises:
obtaining, from the first antenna array of the second wireless node, a third pilot signal via the first beam after the first alignment compensation; and
if a second rotation of the second antenna array relative to the first antenna array satisfies a threshold condition, performing a second alignment compensation based on the second rotation, said second rotation being based on another phase difference between the second pilot signal and the third pilot signal.

16. The method of claim 13, wherein the method further comprises:
outputting, for transmission to the second wireless node, a third pilot signal if a distance between the first antenna array and the second antenna array satisfies a threshold condition;
obtaining, from the second wireless node, a parallel shift based on the third pilot signal; and
performing, based on the parallel shift, beam steering of the first beam.

17. The method of claim 16, wherein the distance satisfies the threshold condition when the distance is equal to a defined value.

18. The method of claim 13, wherein the method further comprises:
obtaining, from the second wireless node, a third pilot signal; and
outputting for transmission to the second wireless node, a parallel shift of the second antenna array relative to the first antenna array based on the third pilot signal.

19. The method of claim 13, wherein the method further comprises:
outputting, for transmission via the second antenna array, a plurality of pilot signals, wherein the plurality of pilot signals are defined by a linear phase shift progression;
obtaining, from the second wireless node, a second rotation of the second antenna array relative to the first antenna array, said second rotation being based on an average phase difference between the plurality of pilot signals; and
performing a second alignment compensation of at least one of the first beam or the second antenna array based on the second rotation.

20. The method of claim 19, wherein the first rotation is a rotation about an axis parallel to a planar surface of the second antenna array, and wherein the second rotation is a rotation about an axis perpendicular to the planar surface of the second antenna array.

21. The method of claim 13, wherein the method further comprises:
obtaining a plurality of pilot signals, wherein the plurality of pilot signals are defined by a linear phase shift progression; and
outputting, for transmission to the second wireless node, an indication of a second rotation of the second antenna array relative to the first antenna array, wherein the second rotation is based on an average phase difference between the plurality of pilot signals.

22. An apparatus for wireless communication at a user equipment (UE), comprising:
one or more memories comprising instructions; and
one or more processors configured to execute the instructions and cause the UE to:
receive, via a second antenna array of the UE, a first pilot signal and a second pilot signal, wherein the first pilot signal and the second pilot signal are received via a first beam, wherein the first pilot signal and the second pilot signal are transmitted from a first antenna array of a wireless node, and wherein each of the first pilot signal and the second pilot signal is one of: a demodulation reference signal (DM-RS), a sounding reference signal (SRS), a channel state information reference signal (CSI-RS), a beam measurement reference signal (BRS), a beam refinement reference signal (BRRS), or a phase tracking reference signal (PT-RS); and
perform a first alignment compensation of at least one of the first beam or the second antenna array based on a first rotation of the second antenna array relative to the first antenna array, said first rotation being based on a phase difference between the first pilot signal and the second pilot signal.

23. The apparatus of claim 22, wherein the first alignment compensation of the first beam comprises beam steering the first beam to compensate for the first rotation, and wherein the first alignment compensation of the second antenna array comprises rotating the second antenna array about an axis parallel to a planar surface of the second antenna array.

24. The apparatus of claim 22, wherein the one or more processors are further configured to cause the UE to:
receive, from the first antenna array of the wireless node, a third pilot signal via the first beam after the first alignment compensation; and
if a second rotation of the second antenna array relative to the first antenna array satisfies a threshold condition, perform a second alignment compensation based on the second rotation, said second rotation being based on another phase difference between the second pilot signal and the third pilot signal.

25. The apparatus of claim 22, wherein the one or more processors are further configured to cause the UE to:
  transmit, to the wireless node, a third pilot signal if a distance between the first antenna array and the second antenna array satisfies a threshold condition; and
  receive, from the wireless node, a parallel shift based on the third pilot signal.

26. The apparatus of claim 22, wherein the one or more processors are further configured to cause the UE to:
  receive, from the wireless node, a third pilot signal; and
  transmit, to the wireless node, a parallel shift of the second antenna array relative to the first antenna array based on the third pilot signal.

27. The apparatus of claim 22, wherein the one or more processors are further configured to cause the UE to:
  transmit, via the second antenna array, a plurality of pilot signals, wherein the plurality of pilot signals are defined by a linear phase shift progression;
  receive, from the wireless node, a second rotation of the second antenna array relative to the first antenna array, said second rotation being based on an average phase difference between the plurality of pilot signals; and
  perform a second alignment compensation of at least one of the first beam or the second antenna array based on the second rotation.

28. The apparatus of claim 22, wherein the one or more processors are further configured to cause the UE to:
  receive a plurality of pilot signals, wherein the plurality of pilot signals are defined by a linear phase shift progression; and
  transmit, to the wireless node, an indication of a second rotation of the second antenna array relative to the first antenna array, wherein the second rotation is based on an average phase difference between the plurality of pilot signals.

29. The apparatus of claim 22, wherein the one or more processors are further configured to cause the UE to:
  transmit, to the wireless node, an alignment capability of the UE, wherein the alignment capability indicates one or more axes of rotation that the UE is configured to correct via compensation of at least one of the first beam or the second antenna array.

30. The apparatus of claim 22, wherein the one or more processors are further configured to cause the UE to:
  receive an alignment capability of the wireless node, wherein the alignment capability indicates one or more axes of rotation that the wireless node is configured to correct via at least one of beam steering or the second antenna array.

* * * * *